US009123385B2

(12) United States Patent
Isozu et al.

(10) Patent No.: US 9,123,385 B2
(45) Date of Patent: Sep. 1, 2015

(54) INFORMATION PROCESSING APPARATUS, INFORMATION PROCESSING METHOD, PROGRAM, AND SURVEILLANCE SYSTEM

(75) Inventors: Masaaki Isozu, Tokyo (JP); Takehiko Sasaki, Kanagawa (JP); Kazuhiro Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 777 days.

(21) Appl. No.: 13/272,746

(22) Filed: Oct. 13, 2011

(65) Prior Publication Data

US 2012/0110509 A1    May 3, 2012

(30) Foreign Application Priority Data

Oct. 27, 2010 (JP) ................................. 2010-240974

(51) Int. Cl.
| | | |
|---|---|---|
| *G06F 3/048* | (2013.01) | |
| *G11B 27/34* | (2006.01) | |
| *G06F 3/0482* | (2013.01) | |
| *H04N 7/18* | (2006.01) | |

(Continued)

(52) U.S. Cl.
CPC .............. *G11B 27/34* (2013.01); *G06F 3/0482* (2013.01); *G06F 3/0485* (2013.01); *G06F 17/30849* (2013.01); *G11B 27/102* (2013.01); *H04N 7/18* (2013.01); *G06F 3/0488* (2013.01); *G06F 3/04817* (2013.01); *G06F 3/04842* (2013.01); *G06F 3/04883* (2013.01)

(58) Field of Classification Search
CPC . G06F 3/0482; G06F 3/04817; G06F 3/0485; G06F 3/04883; G06F 3/0488; G06F 3/04842

USPC .................................................. 715/830, 838
See application file for complete search history.

(56) References Cited

U.S. PATENT DOCUMENTS

| | | | |
|---|---|---|---|
| 5,880,722 | A | 3/1999 | Brewer et al. |
| 6,710,785 | B1 | 3/2004 | Asai et al. |

(Continued)

FOREIGN PATENT DOCUMENTS

| | | |
|---|---|---|
| EP | 0 915 469 A2 | 5/1999 |
| EP | 1 515 552 A1 | 3/2005 |
| JP | 2008-312183 | 12/2008 |

OTHER PUBLICATIONS

Extended Search Report issued Apr. 24, 2012 in European Application No. 11185397.4.

(Continued)

*Primary Examiner* — Tuyetlien Tran
(74) *Attorney, Agent, or Firm* — Hazuki International, LLC

(57) ABSTRACT

An electronic apparatus includes a thumbnail preparation unit configured to retrieve thumbnail images, each thumbnail image representing a scene of a different time of one or more moving images, a first thumbnail line display unit configured to time sequentially display a first plurality of thumbnail images corresponding to at least a part of one of the moving images as a first thumbnail line, a second thumbnail line display unit configured to display a second plurality of thumbnail images corresponding to a marked part of the moving images as a second thumbnail line, and a thumbnail shifting unit configured to shift a selection of a thumbnail along the second thumbnail line and update the first thumbnail line to display at least one thumbnail image of a temporally adjacent part of the marked part of the moving image corresponding to the newly selected thumbnail in response to a user instruction.

11 Claims, 24 Drawing Sheets

(51) Int. Cl.
    *G11B 27/10*    (2006.01)
    *G06F 3/0485*    (2013.01)
    *G06F 17/30*    (2006.01)
    *G06F 3/0488*    (2013.01)
    *G06F 3/0481*    (2013.01)
    *G06F 3/0484*    (2013.01)

(56) References Cited

U.S. PATENT DOCUMENTS

| | | | |
|---|---|---|---|
| 2003/0122861 A1* | 7/2003 | Jun et al. | 345/720 |
| 2004/0008229 A1* | 1/2004 | Hultcrantz | 345/810 |
| 2004/0233238 A1* | 11/2004 | Lahdesmaki | 345/810 |
| 2005/0044489 A1 | 2/2005 | Yamagami et al. | |
| 2005/0210410 A1* | 9/2005 | Ohwa et al. | 715/821 |
| 2005/0257169 A1* | 11/2005 | Tu | 715/810 |
| 2007/0107015 A1* | 5/2007 | Kazama et al. | 725/58 |
| 2007/0206923 A1* | 9/2007 | Murakoshi et al. | 386/95 |
| 2008/0063357 A1* | 3/2008 | Kunieda et al. | 386/52 |
| 2008/0147664 A1* | 6/2008 | Fujiwara et al. | 707/7 |
| 2008/0148335 A1* | 6/2008 | Dawson et al. | 725/132 |
| 2008/0152298 A1 | 6/2008 | Ubillos | |
| 2009/0066706 A1* | 3/2009 | Yasue et al. | 345/505 |
| 2009/0080714 A1* | 3/2009 | Koda | 382/118 |
| 2009/0113345 A1* | 4/2009 | Ishiguro | 715/825 |
| 2009/0172543 A1* | 7/2009 | Cronin et al. | 715/721 |
| 2009/0313545 A1* | 12/2009 | Kim et al. | 715/720 |
| 2010/0262912 A1* | 10/2010 | Cha | 715/719 |
| 2011/0191720 A1* | 8/2011 | Lee | 715/838 |

OTHER PUBLICATIONS

Andreas Girgensohn, et al., "Home Video Editing Made Easy—Balancing Automation and User Control", Human-Computer Interaction, Interact, XP007904111, Jan. 1, 2001, pp. 464-471.

* cited by examiner

| Content ID | Content name | File name | Time stamp | Bookmark | Bookmark-object information |
|---|---|---|---|---|---|
| 01 | ...Park | Park001.png | 2010-08-16 13:00:05 | — | — |
| 01 | ...Park | Park002.png | 2010-08-16 13:00:06 | B | x1,y1 ···· |
| 01 | ...Park | Park003.png | 2010-08-16 13:00:05 | — | — |
| 01 | ...Park | Park004.png | 2010-08-16 13:00:07 | — | — |
| 01 | ...Park | Park005.png | 2010-08-16 13:00:08 | B | x2,y2 ···· |
| 01 | ...Park | Park006.png | 2010-08-16 13:00:09 | B | x3,y3 ···· |
| ... | ... | ... | ... | — | — |
| 02 | ...Trip | Travel010.png | 2010-08-20 10:10:09 | — | — |
| 02 | ...Trip | Travel011.png | 2010-08-20 10:10:10 | B | x4,y4 ···· |
| 02 | ...Trip | Travel012.png | 2010-08-20 10:10:11 | — | — |
| ... | ... | ... | ... | — | — |

FIG.3

| Content ID | Content name | File name | Time stamp | Number of smiles | Smile degree | Bookmark | Bookmark ranks | Bookmark-object information |
|---|---|---|---|---|---|---|---|---|
| 01 | ...Park | Park001.png | 2010-08-16 13:00:04 | 0 | 0 | — | — | — |
| 01 | ...Park | Park002.png | 2010-08-16 13:00:05 | 2 | 43.0 | B | 2 | x1,y1 ..... |
| 01 | ...Park | Park003.png | 2010-08-16 13:00:06 | 0 | 0 | — | — | — |
| 01 | ...Park | Park004.png | 2010-08-16 13:00:07 | 0 | 0 | — | — | — |
| 01 | ...Park | Park005.png | 2010-08-16 13:00:08 | 1 | 16.0 | B | 4 | x2,y2 ..... |
| 01 | ...Park | Park006.png | 2010-08-16 13:00:09 | 3 | 78.0 | B | 1 | x3,y3 ..... |
| 01 | ... | ... | ... | — | — | — | — | — |
| 02 | ...Trip | Travel010.png | 2010-08-20 10:10:09 | 0 | 0 | — | — | — |
| 02 | ...Trip | Travel011.png | 2010-08-20 10:10:10 | 1 | 21.0 | B | 3 | x4,y4 ..... |
| 02 | ...Trip | Travel012.png | 2010-08-20 10:10:11 | 0 | 0 | — | — | — |
| 02 | ... | ... | ... | — | — | — | — | — |

FIG.14

INFORMATION PROCESSING APPARATUS, INFORMATION PROCESSING METHOD, PROGRAM, AND SURVEILLANCE SYSTEM

BACKGROUND

The present disclosure relates to an information processing apparatus, an information processing method, a program, and a surveillance system that present thumbnail images of one or more moving image contents to a user so that the user can grasp contents of scenes.

In recent years, more users view moving images which the users themselves record and moving image contents obtained via the Internet with use of their information terminals. In the environment in which there exist many moving images that can be viewed, such a users' demand as to find, as efficiently as possible, only the scenes that they want to view is expected to increase all the more in the future.

In order to meet such a demand, in various apparatuses, for example, there has been used such a function as to automatically or manually detect highlight scenes in a moving image and add bookmarks thereto. For example, such a technology as to detect moving bodies in a moving image and add bookmarks to the moving bodies thus detected and a frame including the moving bodies is well known. Further, such a method as to recognize a smile of a specific person and similarly add a bookmark thereto, which is achieved by developments of technologies of facial recognition and facial-expression recognition of persons and enhancement of accuracy of the technologies is also well known.

In addition, social bookmark services for sharing the above-mentioned bookmarks with unspecified users have become popular. Sharing of social bookmarks enables users who view a moving image for the first time to view only highlight scenes on their apparatuses. As a result, contents of the moving image can be efficiently grasped.

Incidentally, bookmarks largely contribute to efficiency enhancement also when users search multiple moving images for the scenes that they want to view. However, when users search multiple moving images for such scenes, there is a problem with efficiency, such as necessity for execution of such an operation as to invoke another moving image at each switching of moving images as scene searching objects.

Japanese Patent Application Laid-open No. 2008-312183 (FIG. 3 and paragraphs [0024] and [0025]) (hereinafter, referred to as Patent Document 1) discloses a recording-reproducing apparatus capable of displaying, as a menu screen for selection of moving image contents, a list of thumbnail images of highlight scenes designated from among multiple recorded moving image contents by bookmark operations by a user moving image. When the user designates a target thumbnail image on this menu screen, the corresponding one of the moving image contents is reproduced from a scene added with a bookmark.

SUMMARY

In the disclosure of Patent Document 1, displayed are only the thumbnail images representing scenes each added with a bookmark. However, contents of some scenes may be difficult to be grasped well without previous and subsequent motions of the thumbnail image. For example, even when a smile scene is designated, the smile scene cannot be grasped unless the reason for the smile is understood. In addition, as for a surveillance system, even when moving image contents are surveillance videos of static objects taken by a surveillance camera and moving bodies can be detected from among the surveillance videos and displayed as thumbnail images, characteristics of the moving bodies cannot be ascertained without observation of previous and subsequent motions of the moving bodies.

Under such circumstances, it is desirable to provide an information processing apparatus, an information processing method, a program, and a surveillance system that are capable of supporting users to efficiently grasp important scenes of one or more moving image contents.

As described above, according to the embodiments of the present disclosure, the user can be supported to efficiently grasp important scenes of one or more moving image contents.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 3 shows a configuration of a thumbnail management database illustrated in FIG. 2;

FIG. 14 shows a configuration of a thumbnail management database according to a modification in which bookmark rating is adopted;

DETAILED DESCRIPTION OF EMBODIMENTS

Hereinafter, embodiments of the present disclosure will be described with reference to the drawings.

First Embodiment

Hardware Configuration of Information Processing Apparatus

Figure 1:
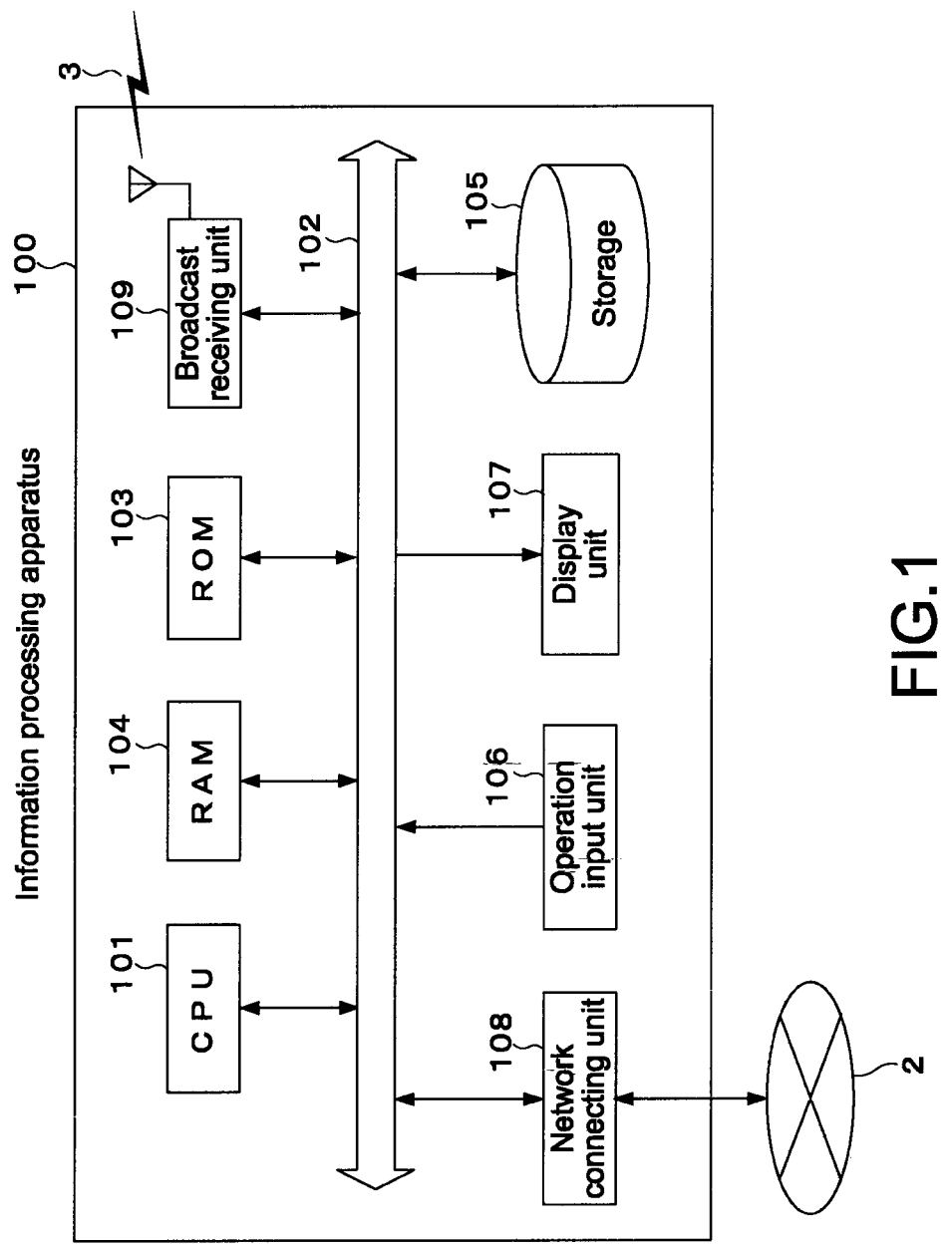
FIG. 1 is a block diagram of a hardware configuration of an information processing apparatus according to a first embodiment of the present disclosure.

FIG. 1 is a block diagram of a hardware configuration of an information processing apparatus 100 according to a first embodiment of the present disclosure.

The information processing apparatus 100 according to this embodiment has a typical computer-hardware configuration. Specifically, the information processing apparatus 100 includes a central processing unit (CPU) 101, a system bus 102, a read only memory (ROM) 103, a random access memory (RAM) 104, a storage 105, an operation input unit 106, a display unit 107, a network connecting unit 108, and a broadcast receiving unit 109.

The ROM 103 is a storage for fixedly storing, for example, various programs to be interpreted and executed by the CPU 101.

The RAM 104 is a storage used as a main memory.

The storage 105 is an apparatus capable of storing user's data such as moving image contents and a thumbnail management database. A hard disk drive (HDD), a solid state drive (SSD), and the like are employed as the storage 105.

The operation input unit 106 is an input apparatus for receiving various operation inputs from a user. The operation input unit 106 may include an input apparatus of a key-input type, or be provided with a touch sensor panel.

The display unit 107 is a display apparatus capable of displaying thumbnail images, moving images, and other images. A liquid crystal display (LCD), an electroluminescence (EL) display, and the like are employed as the display unit 107.

The network connecting unit 108 is a connection unit with respect to a network 2 such as the Internet. The network connecting unit 108 and the like enable the information processing apparatus 100 to exchange information pieces necessary for management of moving image contents and a thumbnail image prepared for each of the moving image contents with server apparatuses and other user's apparatuses which are connected to the information processing apparatus 100 via the network 2.

The broadcast receiving unit 109 receives broadcast waves 3 from broadcast stations of, for example, a terrestrial analog television broadcast, a terrestrial digital television broadcast, a CS digital broadcast, a BS digital broadcast, and a terrestrial analog television broadcast for mobile terminals, and demodulates video signals and audio signals.

The CPU 101 controls blocks in the information processing apparatus 100 and data exchange among the blocks. Further, the CPU 101 executes various arithmetic processes by executing the programs stored in the ROM 103 or programs loaded in the RAM 104. The programs include a program related to a process on the thumbnail images of the moving image contents. In accordance with the program related to the process of the thumbnail images, the CPU 101 is capable of executing processes with regard to generation of the thumbnail images, addition of bookmarks to the thumbnail images, construction of the thumbnail management database, displaying of the thumbnail images, and the like. In the following, a configuration of the program related to the process on the thumbnail images is described as a functional configuration of the information processing apparatus 100.

Although products to which the information processing apparatus according to this embodiment is applicable are not particularly limited, the information processing apparatus according to this embodiment is applicable to general electronic apparatuses capable of processing moving image contents, such a personal computer, a recorder, a media player, a smartphone, and a mobile phone.

[Functional Configuration of Information Processing Apparatus 100]

Figure 2:
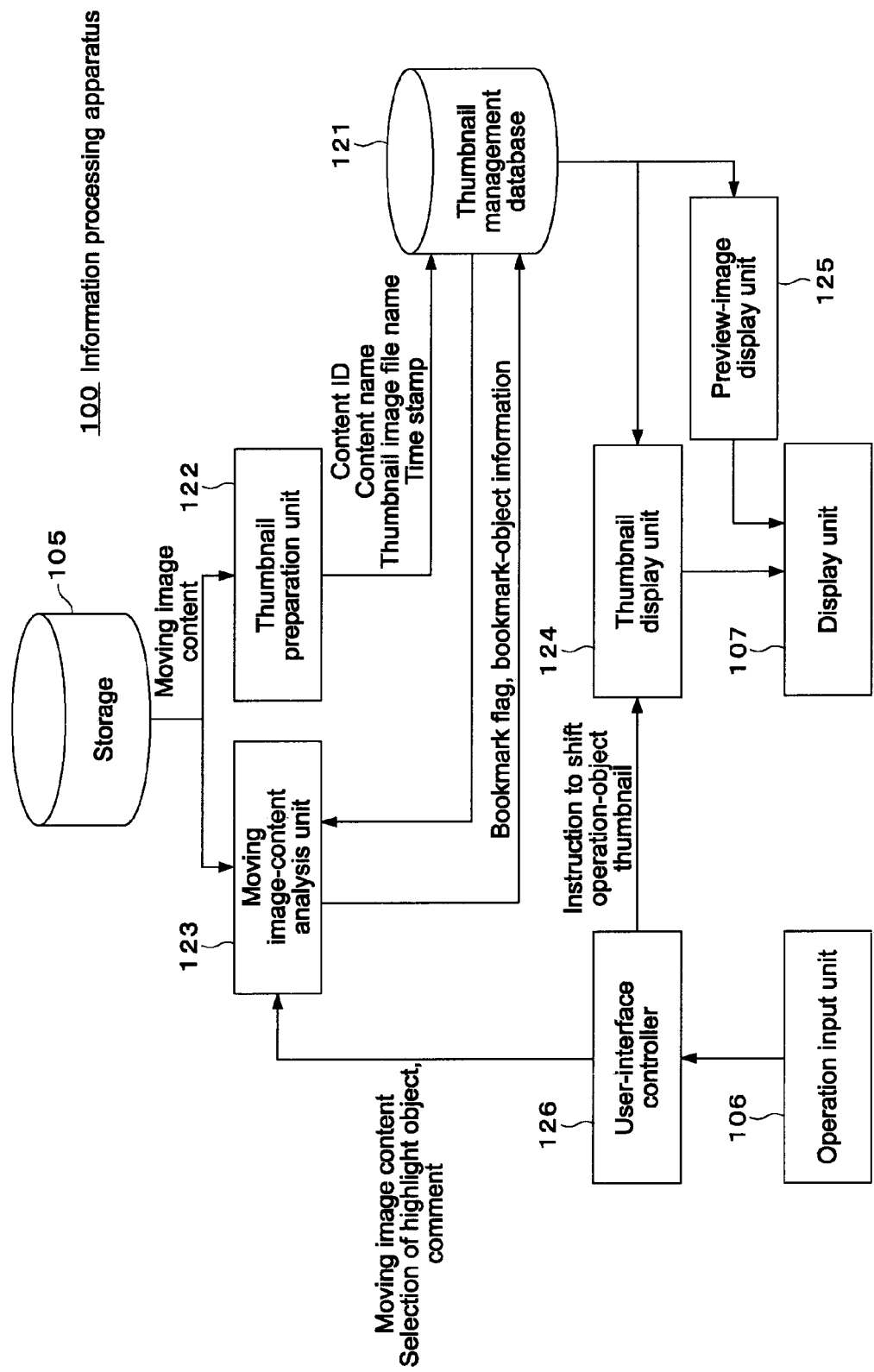
FIG. 2 is a block diagram of a functional configuration of the information processing apparatus of FIG. 1.

FIG. 2 is a block diagram of a functional configuration of the information processing apparatus 100 of FIG. 1.

(1) A thumbnail management database 121 is a database for storing the information pieces necessary for the management of a thumbnail image prepared for each moving image content (corresponds to a thumbnail-image storage and a bookmark-object storage).

FIG. 3 shows a configuration of the thumbnail management database 121.

As illustrated in FIG. 3, the thumbnail management database 121 stores, as information pieces for management of thumbnail images, content IDs, content names, file names of thumbnail images, time stamps, bookmark flags, bookmark-object information pieces, and the like.

The content IDs are information pieces for identification of moving image contents.

The content names are names of the moving image contents. The file names of the thumbnail images are file names of thumbnail images generated based on the moving image contents.

The file names of the thumbnail images are prepared in a thumbnail preparation unit.

The time stamps are information pieces for indicating time positions in the moving image contents respectively identified by the thumbnail images.

The bookmark flags are flags set with respect to the thumbnail images each added with a bookmark.

The bookmark-object information pieces each include a positional information piece with regard to a highlight object in a frame space and a readable comment information piece such as a reason for addition of the bookmarks.

As such information pieces with regard to thumbnail images, information pieces prepared in other user's apparatuses, such as a social bookmark, may be obtained in the information processing apparatus 100 and stored in the thumbnail management database 121 to be used. Alternatively, the information pieces may be generated in the information processing apparatus 100.

Referring back to FIG. 2, (2) A thumbnail preparation unit 122 generates multiple thumbnail images based on moving image contents stored in the storage 105. The thumbnail preparation unit 122 generates thumbnail images each representing a scene, for example, for each predetermined time interval of the moving image contents, and registers respective information pieces with regard to the thumbnail images thus generated into the thumbnail management database 121 as new records. The predetermined time interval is set to, for example, 1 second. When the moving image contents are compression-coded with MPEG-2, the thumbnail images may be prepared from intra pictures (I-pictures). The information pieces with regard to the thumbnail images registered into the thumbnail management database 121 by the thumbnail preparation unit 122 include content IDs, content names, file names of the thumbnail images, and time stamps.

(3) A moving image-content analysis unit 123 analyzes the moving image contents stored in the storage 105 and judges the following scenes as "important scenes": scenes in which a moving body is detected; scenes in which high points such as smiles and zoom-up are detected; and scenes immediately after scene changes.

The moving image-content analysis unit 123 judges a representative thumbnail image of the important scenes through comparison of time positions of the important scenes thus judged in the moving image contents and respective time stamps for the thumbnail images registered to the thumbnail management database 121. Then, the moving image-content analysis unit 123 sets bookmark flags with respect to records of information pieces with regard to the thumbnail images thus judged.

Further, the moving image-content analysis unit 123 is capable of generating the following as the bookmark-object information pieces: positional information pieces of highlight objects such as moving bodies in frame spaces which are detected in frames as the important scenes, and readable comment information pieces such as reasons for addition of bookmarks, and then registering the bookmark-object information pieces into the thumbnail management database 121.

Still further, without using the moving image-content analysis unit 123, a user himself/herself may select the important scenes and the highlight objects after viewing the moving image contents so as to add bookmarks, instruct the moving image-content analysis unit 123 to generate the bookmark-object information pieces, and directly input comment information pieces.

(4) A thumbnail display unit 124 is invoked when the user instructs thumbnail-image listing for search for scenes. The thumbnail display unit 124 refers to the thumbnail management database 121 and arranges, in a single horizontal row in a time-stamp order, thumbnail images corresponding to at least a part of a time-series part in a thumbnail-image time series of one moving image content so as to display them as a lateral thumbnail line.

In addition, the thumbnail display unit 124 executes such a process as to arrange, in a single vertical row, thumbnail images each added with a bookmark in thumbnail-image time series of one or more moving image contents, and display them as a vertical thumbnail line. Hereinafter, the thumbnail images each added with a bookmark are referred to as "important thumbnail images."

In this embodiment, the thumbnail display unit 124 arranges respective important thumbnail images of the moving image contents in a single vertical line so as to display them as the vertical thumbnail line.

(5) A preview-image display unit 125 executes such a process as to generate preview images, which correspond to thumbnail images displayed as operation-object thumbnails, from a corresponding frame or a corresponding thumbnail image of each of the moving image contents, and display the preview images. Further, the preview-image display unit 125 is capable of generating, when bookmark-object information pieces are registered in the thumbnail management database 121 correspondingly to the thumbnail images displayed as the operation-object thumbnails, a point mark for indicating a position of a highlight object based on a positional information piece of the highlight object contained in the bookmark-object information pieces, and displaying the point mark by combining the point mark with the preview image together with a comment information piece contained in the bookmark-object information pieces.

(6) A user-interface controller 126 transmits an instruction of a leftward or rightward shift with respect to the operation-object thumbnail as a first instruction to the thumbnail display unit 124, and transmits an instruction of an upward or downward shift with respect to the operation-object thumbnail as a second instruction to the thumbnail display unit 124, the instructions being input by a user via the operation input unit 106.

In response to the instruction of the leftward or rightward shift with respect to the operation-object thumbnail given by a user via the user-interface controller 126, the thumbnail display unit 124 changes a time-series part corresponding to the thumbnail images displayed in the lateral thumbnail line.

Further, in response to the instruction of the upward or downward shift with respect to the operation-object thumbnail given by a user via the user-interface controller 126, the thumbnail display unit 124 updates the lateral thumbnail line at a time-series part corresponding to thumbnail images subsequent to an important thumbnail image at a shift destination on the vertical thumbnail line, and updates the vertical thumbnail line in accordance therewith.

[Display Mode of Thumbnail Lines]

Figure 4:
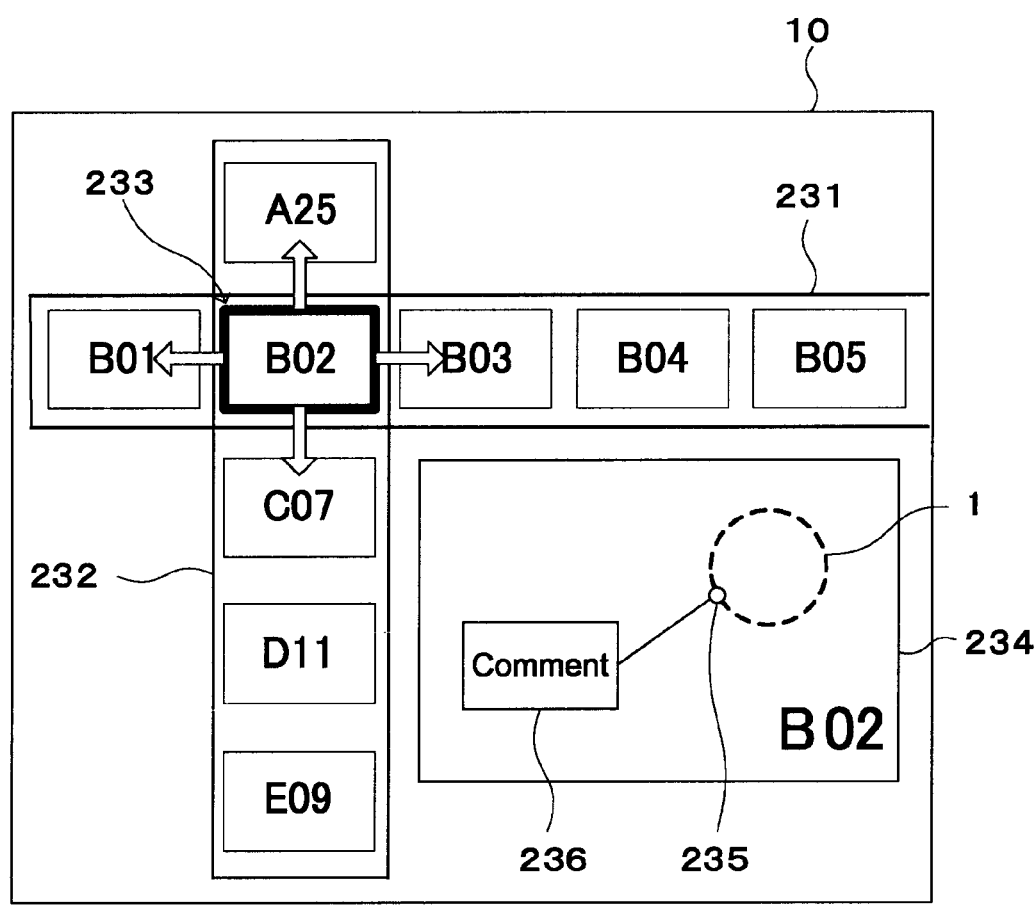
FIG. 4 illustrates a representative display mode of a lateral thumbnail line and a vertical thumbnail line in a scene searching screen according to the first embodiment of the present disclosure.

FIG. 4 is a representative display mode of a lateral thumbnail line 231 and a vertical thumbnail line 232 in a scene searching screen. In this case, multiple moving image contents stored in the storage 105 are denoted by "A, B, . . . , and E," and thumbnail images belonging to respective moving image contents are denoted by a combination of the denotation of the moving image contents and numbers given from "01" in a temporal ascending order. For example, the second thumbnail image from the top of the moving image content B is denoted by "B02."

The lateral thumbnail line 231 is constituted of N thumbnail images corresponding to at least a part of a time-series part in a thumbnail-image time series of one moving image content. In the example of FIG. 4, five thumbnail images B01, B02, B03, B04, and B05 successive in a time-stamp order constitute the lateral thumbnail line 231. The N thumbnail images are arrayed from left to right on the lateral thumbnail line 231 in the time-stamp order.

In this case, N is an upper limit number of thumbnail images arranged on the lateral thumbnail line 231 displayed on a display screen 10. The time-series part corresponding to the thumbnail images displayed on the lateral thumbnail line 231 is actually a part of the entire thumbnail-image time series, and a partial shift of the time-series part enables users to view all the thumbnail images on the lateral thumbnail line 231. That is, the time-series part corresponding to the thumbnail images displayed on the lateral thumbnail line 231 is changed back and forth temporally by the instruction of the leftward or rightward shift with respect to an operation-object thumbnail 233 given by a user. Detailed description is made below of such an operation as to change the time-series part corresponding to the thumbnail images displayed on the lateral thumbnail line 231.

Meanwhile, in this embodiment, the vertical thumbnail line 232 is constituted of a total of M thumbnail images of different moving image contents. In the illustration of FIG. 4, five thumbnail images A25, B02, C07, D11, and E09 constitute the vertical thumbnail line 232. The lateral thumbnail line 231 and the vertical thumbnail line 232 share thumbnail images. The shared thumbnail images correspond to the operation-object thumbnail 233. In this embodiment, the lateral thumbnail line 231 and the vertical thumbnail line 232 have such a relation as to cross and to be superimposed on each other via one thumbnail image. The one thumbnail image at this crossing point is defined as the operation-object thumbnail 233. In FIG. 4, the thumbnail image B02 is defined as the operation-object thumbnail 233.

When any of all the moving image contents includes an important thumbnail image, the respective thumbnail images of the moving image contents displayed on the vertical thumbnail line 232 are thumbnail images each added with a bookmark (important thumbnail images) at least in an initial state. In other words, although the thumbnail image assigned as the operation-object thumbnail 233 may be a thumbnail image that has not yet been added with a bookmark owing to a shift operation of the time-series part corresponding to the thumbnail images displayed on the lateral thumbnail line 231, it is guaranteed that, on the vertical thumbnail line 232, all the thumbnail images other than the thumbnail image assigned as the operation-object thumbnail 233 are thumbnail images each added with a bookmark (important thumbnail images). Note that this is not applicable to a case where there is a moving image content that includes not even one important thumbnail image.

When one moving image content includes multiple important thumbnail images, among those important thumbnail images, for example, the temporally top important thumbnail image is displayed on the vertical thumbnail line 232. Alternatively, of the multiple important thumbnail images, an intermediate important thumbnail image may be displayed on the vertical thumbnail line 232, or a temporally last important thumbnail image may be displayed thereon. Also, a user may be allowed to make a setting on which important thumbnail image at what position is to be displayed on the vertical thumbnail line 232.

The moving image contents are arrayed from top to bottom in the vertical thumbnail line 232 in an ascending or descending order of a content ID. The content ID is a number added to each of the moving image contents in the ascending order of preparation of thumbnail images by the thumbnail preparation unit 122. Alternatively, the moving image contents may be used by being sorted under some other conditions, for example, a shooting order of the moving image contents, a name order of shooters, and the order of importance set by the user with respect to the moving image contents.

The vertical thumbnail line 232 is updated in accordance with an update of the lateral thumbnail line at the time-series part corresponding to the thumbnail images subsequent to the important thumbnail image at the shift destination on the vertical thumbnail line by the instruction of the upward or downward shift with respect to the operation-object thumbnail 233 given by the user.

Figure 9:
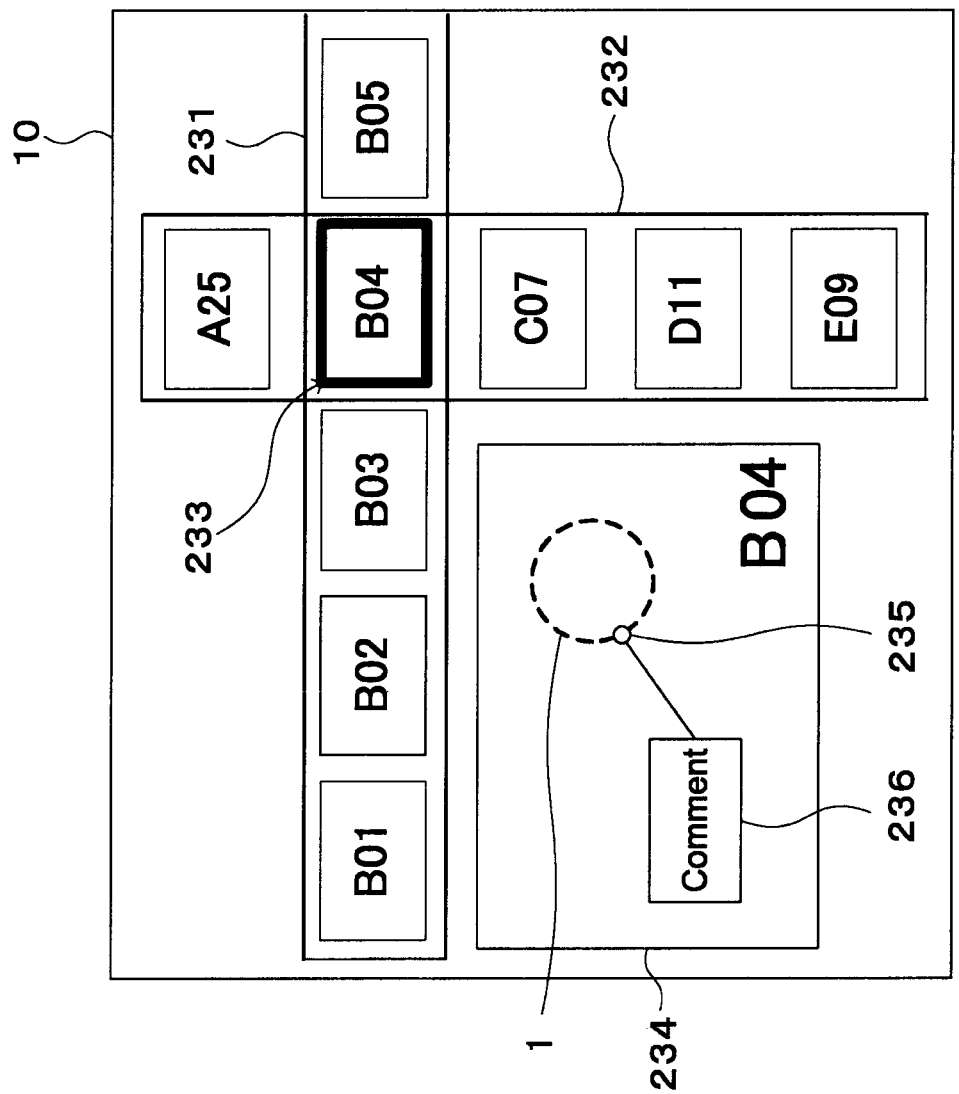
FIG. 9 illustrates another display mode of the lateral thumbnail line and the vertical thumbnail line.

A display position of the vertical thumbnail line 232 in a lateral direction can be freely changed in display sizes of one thumbnail image displayed on the lateral thumbnail line 231 by, for example, a drag operation (third instruction) by the user. In the illustration of FIG. 4, the vertical thumbnail line 232 is at such a position as to be superimposed on the second leftmost thumbnail image of the lateral thumbnail line 231. When the vertical thumbnail line 232 is at a leftward position on the lateral thumbnail line 231, more thumbnail images subsequent to the important thumbnail image can be displayed. Thus, this configuration is suitable when wishing to mainly view motions subsequent to that expressed by the important thumbnail image. In contrast, in order to view motions prior to that expressed by the important thumbnail image, as illustrated in FIG. 9, it suffices that the operation-object thumbnail 233 is shifted to a rightward position on the lateral thumbnail line 231 by the drag operation.

Note that a display position of the lateral thumbnail line 231 in a vertical direction may also be vertically shifted by the drag operation and the like.

Further, referring back to FIG. 4, the display screen 10 displays, simultaneously with those lateral thumbnail line 231 and vertical thumbnail line 232, a preview image 234 corresponding to a thumbnail image assigned as the operation-object thumbnail 233. In this embodiment, a region in which the thumbnail image is displayed is spatially restricted by the lateral thumbnail line 231 and the vertical thumbnail line 232, with the result that a space for displaying the preview image 234 is sufficiently secured.

As illustrated in FIG. 4, the preview image 234 displays, in addition to a point mark 235 indicating a position of a highlight object 1 in the preview image 234, a readable comment information piece 236 such as a reason for addition of a bookmark. The comment information piece 236 is displayed in a form of a cartoon bubble or the like.

[Operation of Thumbnail Display Unit 124]

Next, description is made on such an operation of the thumbnail display unit 124 as to prepare an initial lateral thumbnail line 231 and an initial vertical thumbnail line 232.

Figure 10:
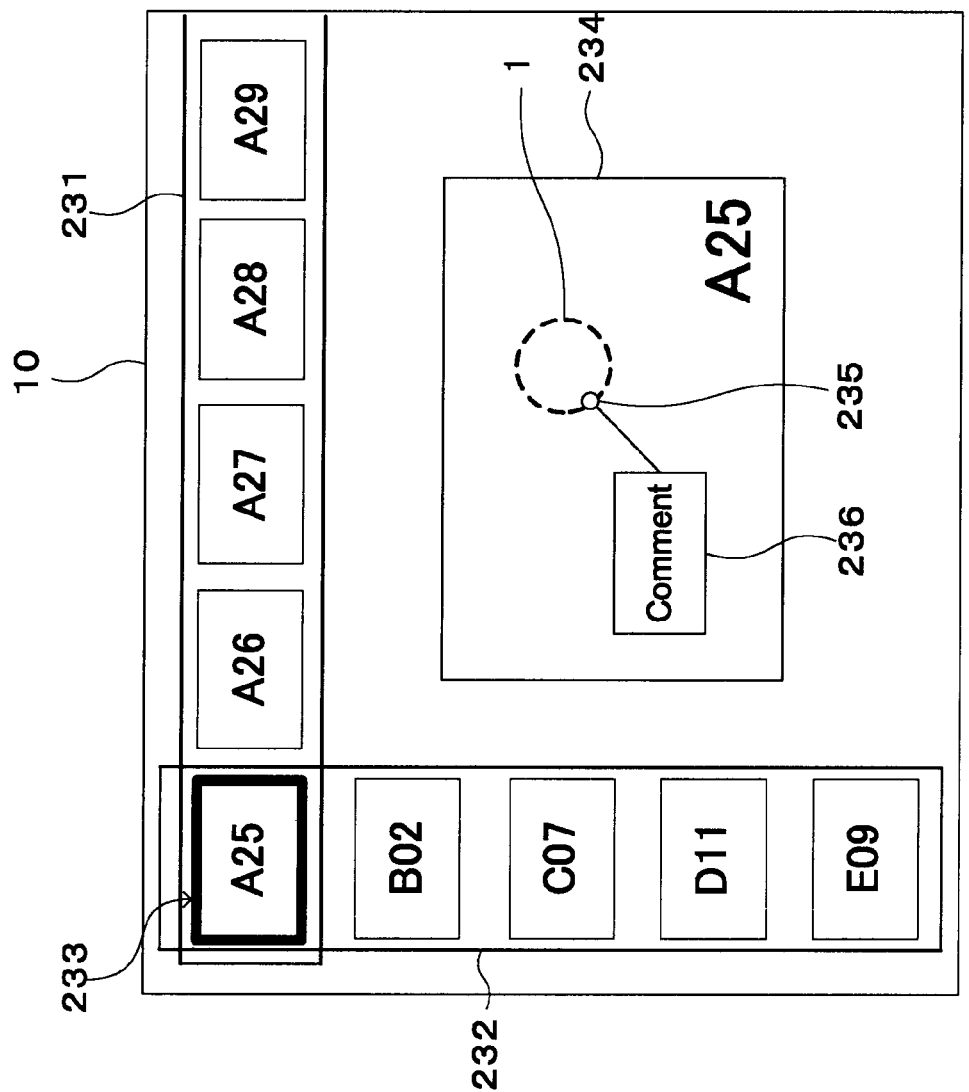
FIG. 10 illustrates an initial display mode of the lateral thumbnail line and the vertical thumbnail line.

FIG. 10 illustrates an initial display mode of the lateral thumbnail line 231 and the vertical thumbnail line 232. As illustrated in FIG. 10, in the initial display mode of the lateral thumbnail line 231 and the vertical thumbnail line 232, the top important thumbnail image of the top moving image content is assigned as the operation-object thumbnail 233, and a display position of the vertical thumbnail line 232 in the lateral direction is at a leftmost position.

Figure 11:
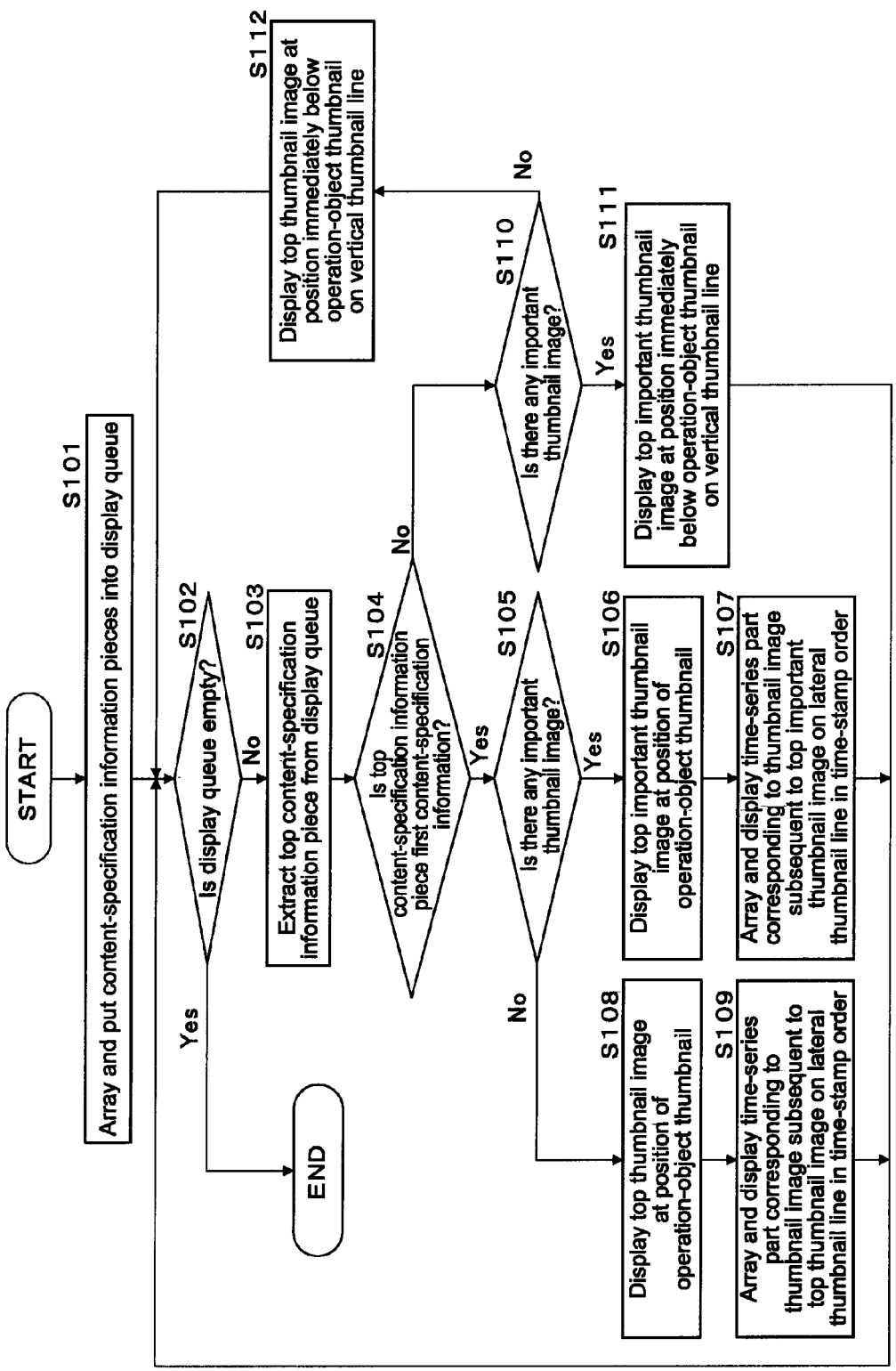
FIG. 11 is a flowchart showing a procedure of preparation, which is performed by a thumbnail display unit according to the first embodiment, of an initial lateral thumbnail line and an initial vertical thumbnail line.

FIG. 11 is a flowchart showing a procedure of preparation of the initial lateral thumbnail line 231 and the initial vertical thumbnail line 232 performed by the thumbnail display unit 124.

First, the thumbnail display unit 124 arrays respective information pieces for specification of moving image contents managed in the thumbnail management database 121, that is, content-specification information pieces such as content IDs and content names in the order determined depending on those contents IDs, content names, and the like. Then, the thumbnail display unit 124 puts the content-specification information pieces into a display queue (S101). Next, the thumbnail display unit 124 extracts a top content-specification information piece from the display queue (S103).

When the top content-specification information piece is a content-specification information piece extracted first from the display queue (S104), the thumbnail display unit 124 refers to the thumbnail management database 121 based on this content-specification information piece, and checks whether or not there exist thumbnail images each added with a bookmark (important thumbnail images) with regard to the corresponding moving image content (S105).

When the important thumbnail images exist, the thumbnail display unit 124 displays a top important thumbnail image of those important thumbnail images at a position of the operation-object thumbnail 233 (S106). Next, the thumbnail display unit 124 arrays and displays, at positions subsequent to the position of the operation-object thumbnail 233 on the lateral thumbnail line 231 in a time-stamp order, a time-series part corresponding to (N−1) thumbnail images subsequent to the top important thumbnail image displayed at the position of the operation-object thumbnail 233 (S107).

Further, in S105, in a case where the important thumbnail images have been judged not to exist, the thumbnail display unit 124 extracts a top thumbnail image of the corresponding moving image content from the thumbnail management database 121, and displays the top thumbnail image at the position of the operation-object thumbnail 233 (S108). Next, the thumbnail display unit 124 extracts, from the thumbnail management database 121, the (N−1) thumbnail images subsequent to the top thumbnail image displayed at the position of the operation-object thumbnail 233 (S109), and arrays and displays the (N−1) thumbnail images at positions subsequent to the position of the operation-object thumbnail 233 on the lateral thumbnail line 231 in the time-stamp order.

After that, the thumbnail display unit 124 extracts again another top content-specification information piece from the display queue (S103). Note that, another top content-specification information piece at the top at this time point is an information piece that has been second from the top in the initial state of the display queue. Then, the thumbnail display unit 124 checks whether or not a moving image content, which is specified by a newly obtained content-information piece, has important thumbnail images (S110). When important thumbnail images exist, the thumbnail display unit 124 displays, for example, a top one of the important thumbnail images at a position immediately below the operation-object thumbnail 233 on the vertical thumbnail line 232 (S111). When the important thumbnail images do not exist, the thumbnail display unit extracts a top thumbnail image of the corresponding moving image content from the thumbnail management database 121, and similarly displays the top thumbnail image at the position immediately below the operation-object thumbnail 233 on the vertical thumbnail line 232 (S112).

After that, whenever the content-specification information piece is extracted from the display queue, operations of S110, S111, and S112 are repeated. With this, when any of all the moving image contents includes even one important thumbnail image, respective thumbnail images of different moving image contents are arranged on the vertical thumbnail line 232. When the display queue becomes empty (YES in S102), the operation of the thumbnail display unit 124 is completed.

[User Operations with Respect to Lateral Thumbnail Line and Vertical Thumbnail Line]

Next, description is made on user operations with respect to the lateral thumbnail line 231 and the vertical thumbnail line 232.

The user-interface controller 126 receives the instruction of the upward, downward, leftward, or rightward shift with respect to the operation-object thumbnail 233 from the user via the operation input unit 106, and transmits contents of the instruction to the thumbnail display unit 124.

As described above, the time-series part corresponding to the thumbnail images displayed on the lateral thumbnail line 231 is changed temporally back and forth by the instruction of the leftward or rightward shift with respect to the operation-object thumbnail 233 (first instruction) given by the user.

Figure 5:
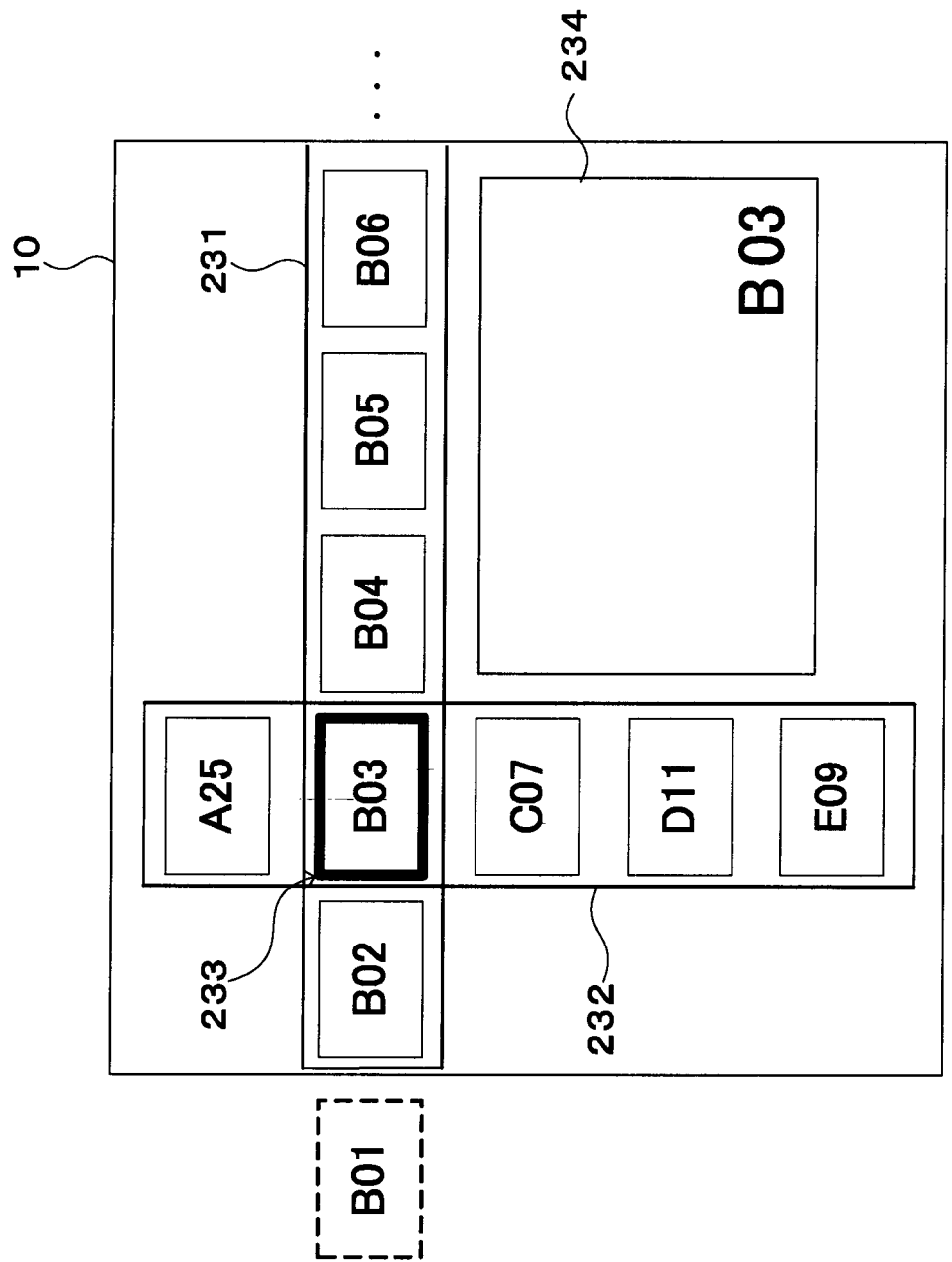
FIG. 5 illustrates an update result of the lateral thumbnail line and the vertical thumbnail line in a case where an instruction of a single rightward shift is input to an operation-object thumbnail.

For example, in the state of FIG. 4, when the instruction of the single rightward shift with respect to the operation-object thumbnail 233 is input, the thumbnail display unit 124 shifts, as illustrated in FIG. 5, the time-series part corresponding to the thumbnail images displayed on the lateral thumbnail line 231 so that the thumbnail image B03 comes to the position of the operation-object thumbnail 233 in place of the thumbnail image B02. In accordance therewith, the preview-image display unit 125 updates, as the preview image 234, an image corresponding to the thumbnail image B02 to an image corresponding to the thumbnail image B03.

Figure 6:
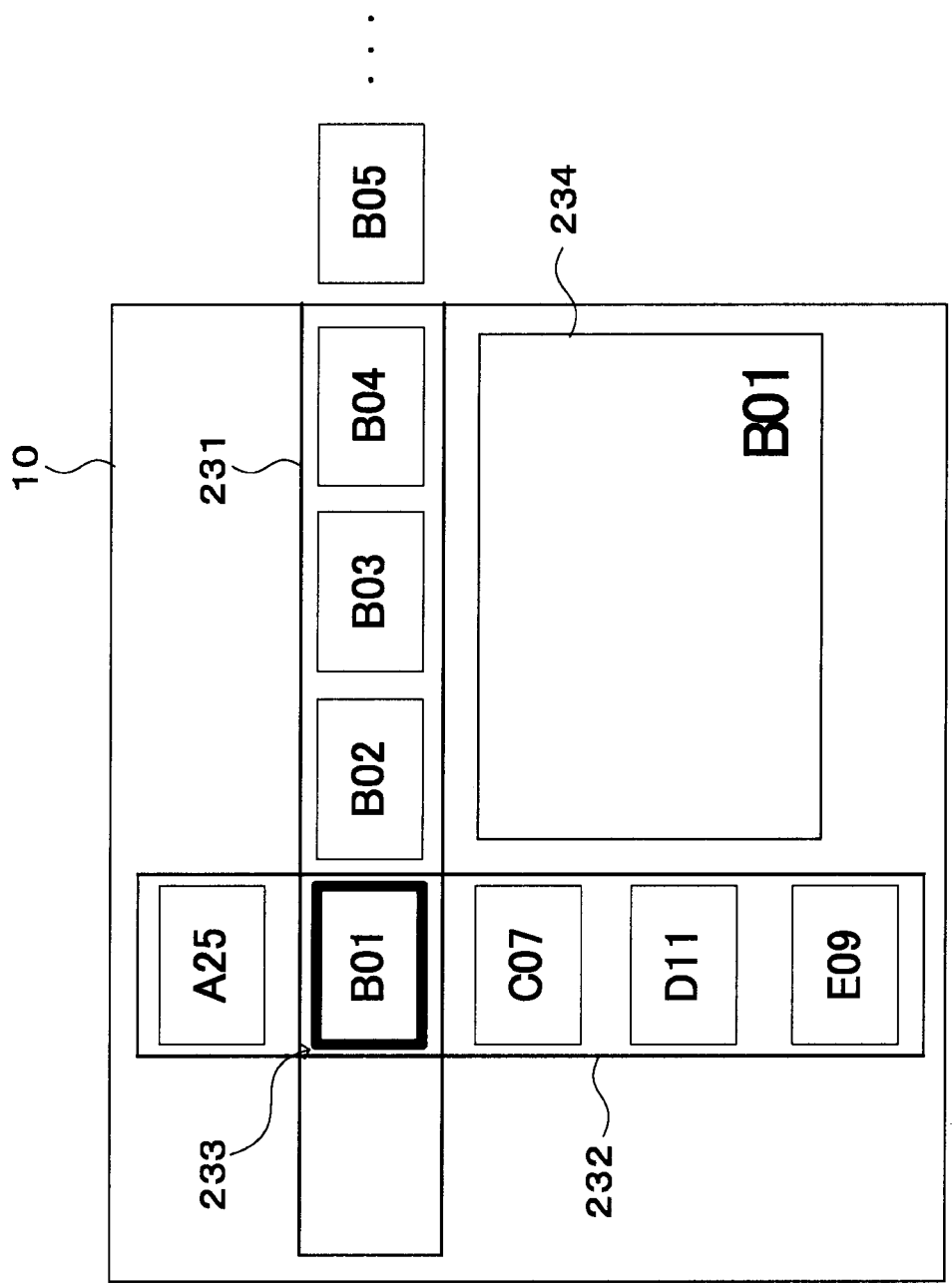
FIG. 6 illustrates an update result of the lateral thumbnail line and the vertical thumbnail line in a case where an instruction of a single leftward shift is input to the operation-object thumbnail.

In contrast, when the instruction of the single leftward shift with respect to the operation-object thumbnail 233 is input, the thumbnail display unit 124 shifts, as illustrated in FIG. 6, the time-series part corresponding to the thumbnail images assigned to the lateral thumbnail line 231 so that the thumbnail image B01 comes to the position of the operation-object thumbnail 233 in place of the thumbnail image B02. In accordance therewith, the preview-image display unit 125 updates, as the preview image 234, the image corresponding to the thumbnail image B02 to an image corresponding to the thumbnail image B01.

Meanwhile, an array of the respective thumbnail images of the different moving image contents, which is displayed on the vertical thumbnail line 232, is updated by the instruction of the upward or downward shift with respect to the operation-object thumbnail 233 (second instruction). Further, in accordance with the update, moving image contents assigned to the lateral thumbnail line are changed.

Figure 7:
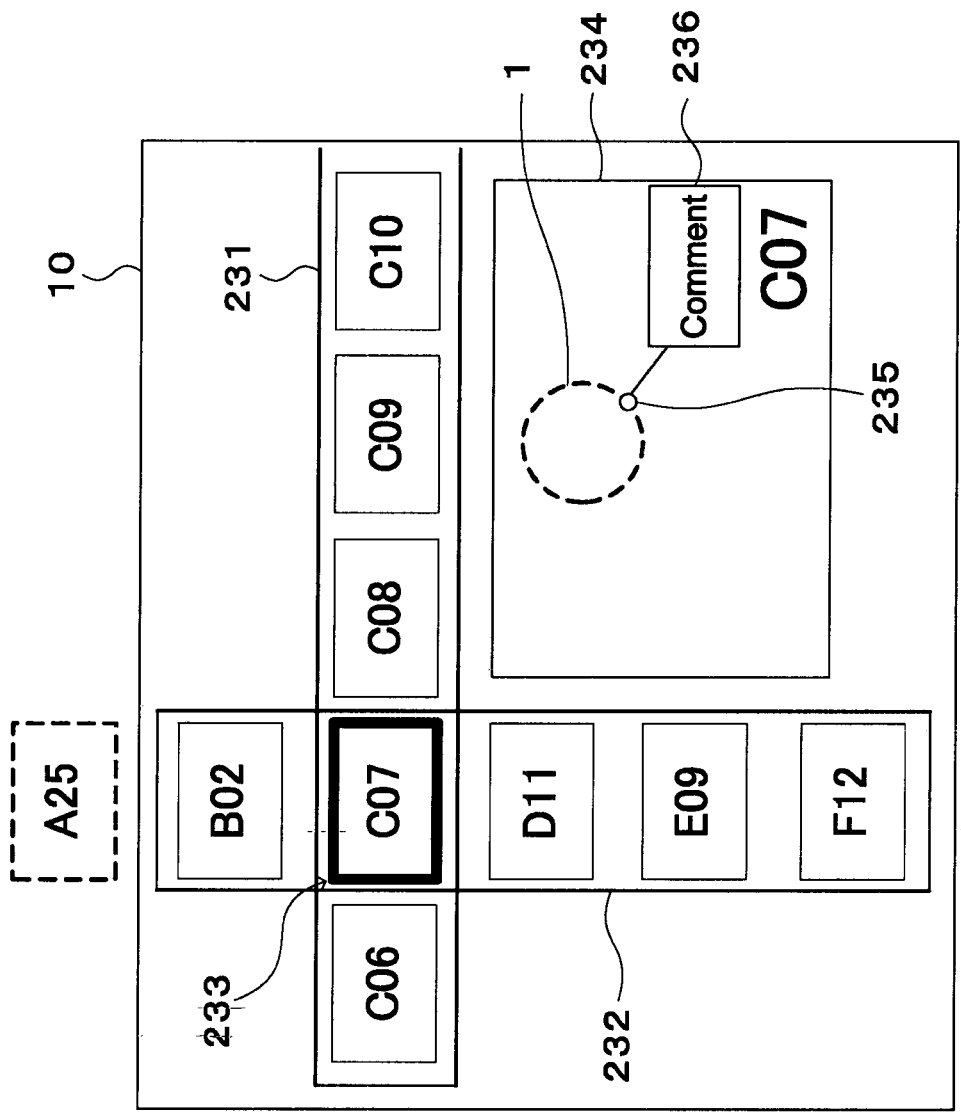
FIG. 7 illustrates an update result of the lateral thumbnail line and the vertical thumbnail line in a case where an instruction of a single downward shift is input to the operation-object thumbnail.

For example, in the state of FIG. 4, when the instruction of the single downward shift with respect to the operation-object thumbnail 233 is input, the thumbnail display unit 124 shifts, as illustrated in FIG. 7, an array of the thumbnail images on the vertical thumbnail line 232 so that the important thumbnail image C07 comes to the position of the operation-object thumbnail 233 in place of the thumbnail image B02. In this case, the vertical thumbnail line 232 is displayed at a second leftmost position in the lateral direction, and the important thumbnail image, which is assigned as the operation-object thumbnail 233, is C07. Thus, five thumbnail images from C06 to C10 are displayed while being assigned to the lateral thumbnail line 231. Further, in accordance therewith, the preview-image display unit 125 updates, as the preview image 234, the image corresponding to the thumbnail image B02 to an image corresponding to the important thumbnail image C07.

Figure 8:
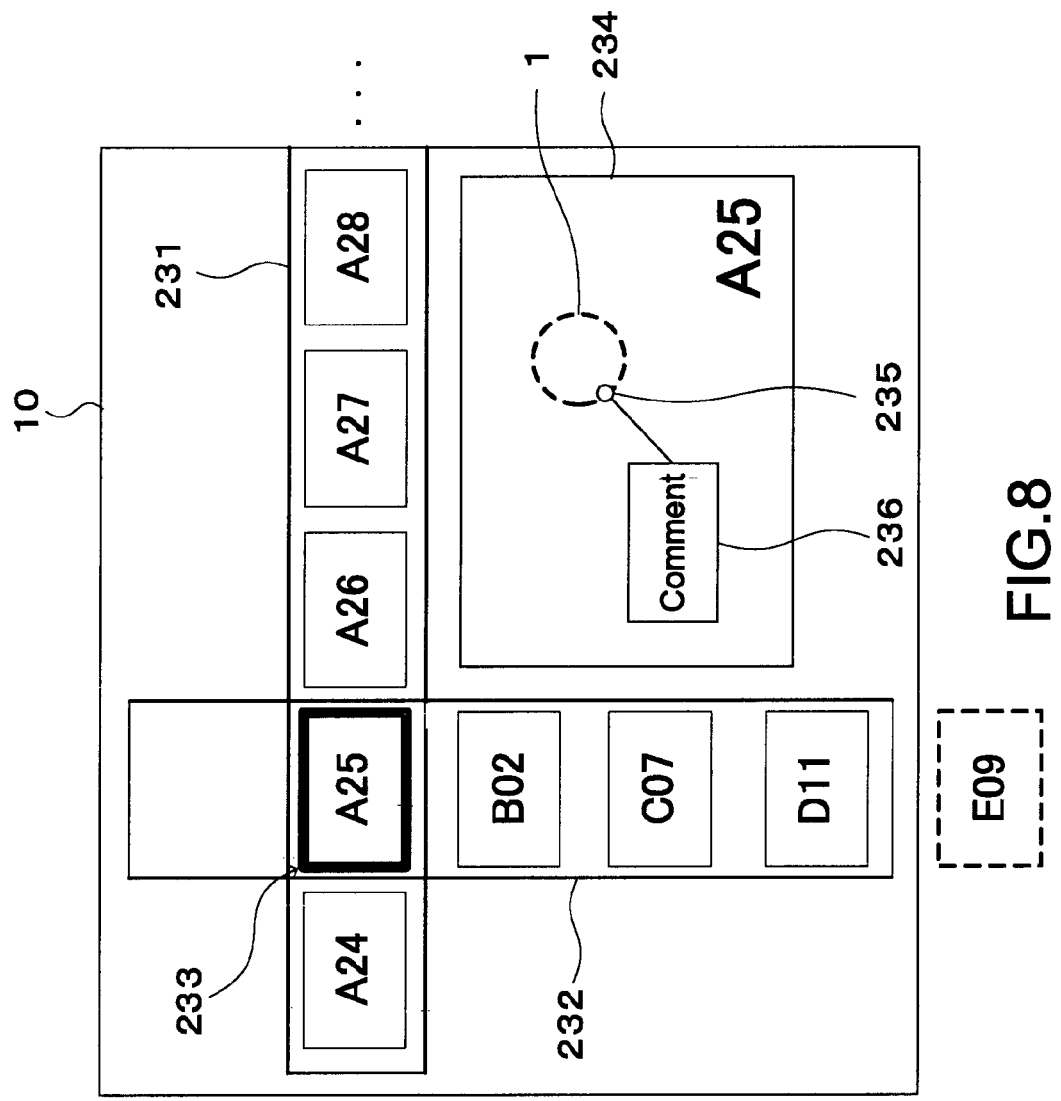
FIG. 8 illustrates an update result of the lateral thumbnail line and the vertical thumbnail line in a case where an instruction of a single upward shift is input to the operation-object thumbnail.

In contrast, in the state of FIG. 4, when the instruction of the single upward shift with respect to the operation-object thumbnail 233 is input, the thumbnail display unit 124 shifts, as illustrated in FIG. 8, the array of the thumbnail images assigned to the vertical thumbnail line 232 so that the important thumbnail image A25 comes to the position of the operation-object thumbnail 233 in place of the thumbnail image B02. In this case, the vertical thumbnail line 232 is at the second leftmost position in the lateral direction, and the important thumbnail image, which is assigned as the operation-object thumbnail 233, is A25. Thus, five thumbnail images from A24 to A28 are displayed while being assigned to the lateral thumbnail line 231. In accordance therewith, the preview-image display unit 125 updates, as the preview image 234, the image corresponding to the thumbnail image B02 to an image corresponding to the important thumbnail image A25.

As described above in this embodiment, only by the instruction of the upward or downward shift with respect to the operation-object thumbnail 233 given by the user, the important thumbnail images to be displayed can be switched, and the user can view each of the important thumbnail images and the time-series part corresponding to the thumbnail images successive thereto. Thus, the user can grasp the important thumbnail images together with previous and subsequent motions of each of the important thumbnail images, and hence the user can more accurately and easily grasp contents of scenes. Further, in this embodiment, the respective important thumbnail images of the different moving image contents are displayed on the vertical thumbnail line 232, and hence display switching can be quickly performed between the respective important thumbnail images of the different moving image contents. As a result, operability in scene search is enhanced.

Further, the time-series part corresponding to the thumbnail images displayed on the lateral thumbnail line 231 can be shifted by the instruction of the leftward or rightward shift with respect to the operation-object thumbnail 233. Thus, thumbnail images, which are out of a range displayed on the lateral thumbnail line 231 immediately after an object of scene search is switched to another moving image content, can be freely referred to.

Further, according to this embodiment, the user can freely change the display position of the vertical thumbnail line 232 in the lateral direction by the drag operation and the like. Thus, a direction in which motions are intensively followed from a thumbnail image added with a bookmark can be freely switched between the forward direction and the backward direction.

Still further, according to this embodiment, the region in which the thumbnail image is displayed is spatially restricted by the lateral thumbnail line 231 and the vertical thumbnail line 232, with the result that a space for displaying the preview image 234 can be sufficiently secured. In addition, in comparison with such a method that respective thumbnail images of multiple moving image contents are displayed by being vertically and laterally laid, a consumption amount of hardware resources for displaying of the thumbnail images can be reduced. In other words, the information processing apparatus 100 which is excellent in scene-search efficiency despite a small consumption amount of hardware resources can be provided.

In the following, description is made on modifications of the embodiment of the present disclosure.

First Modification

Figure 12:
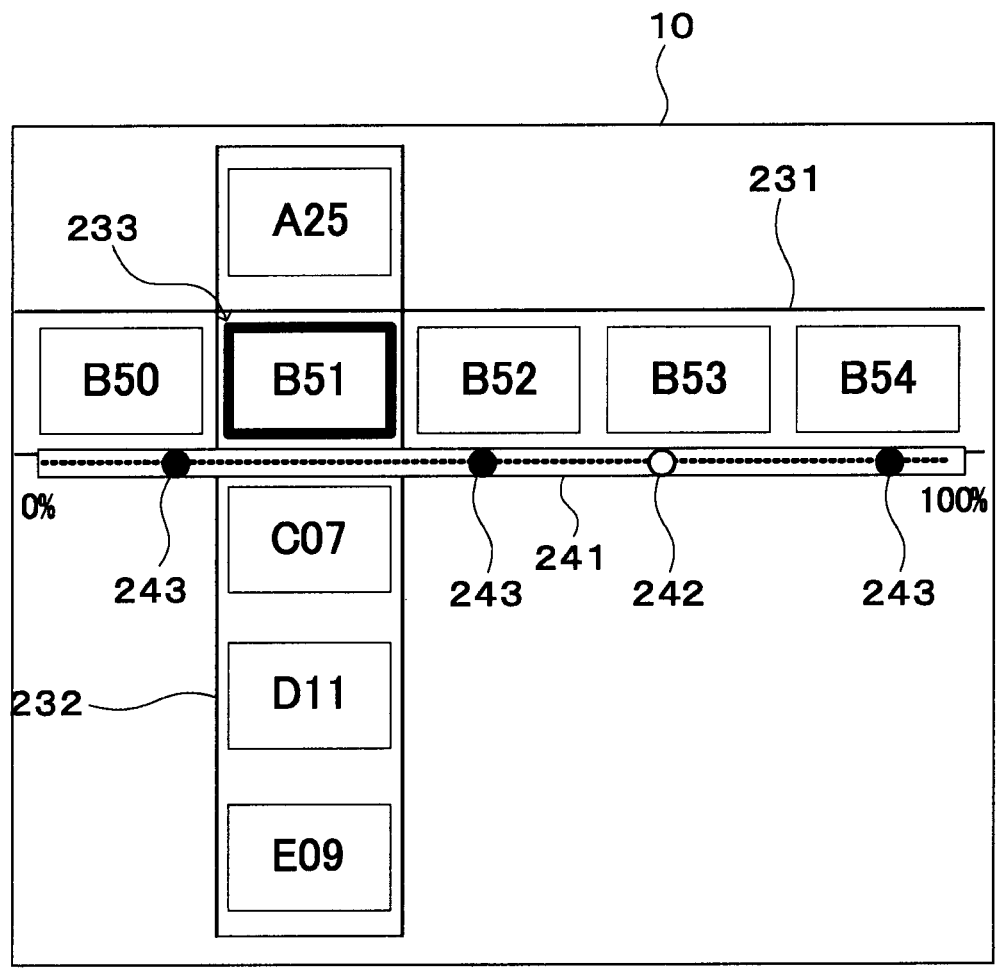
FIG. 12 illustrates a modification in which a progress bar is displayed in addition to the lateral thumbnail line and the vertical thumbnail line.

FIG. 12 illustrates a first modification of the above-mentioned embodiment. Although thumbnail images of one moving image content are displayed in a time-stamp order on the lateral thumbnail line 231, the number of thumbnail images simultaneously displayed on the display screen 10 corresponds to only a part of the entire thumbnail images. As a countermeasure, as illustrated in FIG. 12, added is a progress bar 241 which visually represents, on a moving image-content time line assigned so that a time-series part corresponding to thumbnail images is displayed on the lateral thumbnail line 231, a temporal position of a thumbnail image assigned as the operation-object thumbnail 233 and temporal positions of thumbnail images each added with a bookmark (important thumbnail images).

On this progress bar 241, present temporal positions of the thumbnail image assigned as the operation-object thumbnail 233 and the thumbnail images each added with a bookmark (important thumbnail images) are respectively displayed by a present-time indicator 242 and bookmark-time indicators 243 with which the temporal positions can be identified. In this case, the present-time indicator 242 indicates the temporal position of the thumbnail image assigned as the operation-object thumbnail 233, and the bookmark-time indicators 243 indicate the important thumbnail images.

When a user performs a predetermined selecting operation such as a click operation with respect to any of the bookmark-time indicators 243 on the progress bar 241, the thumbnail display unit 124 shifts the time series of the thumbnail images displayed on the lateral thumbnail line 231 so that thumbnail images corresponding to the bookmark-time indicators 243 come to the position of the operation-object thumbnail 233. With this, jumps can be performed between the thumbnail images each added with a bookmark (important thumbnail images) in one moving image content.

Second Modification

Figure 13:
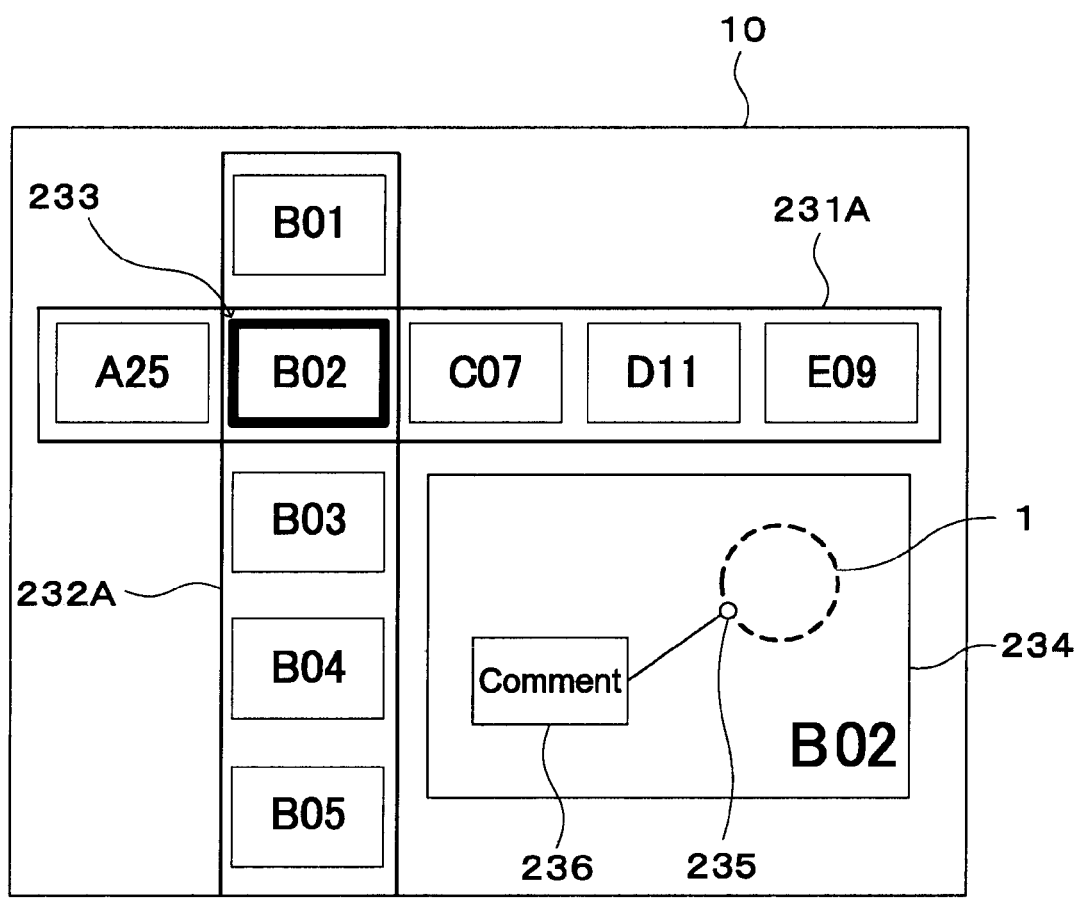
FIG. 13 illustrates a modification in which the lateral thumbnail line and the vertical thumbnail line are reversed in function.

In the above-mentioned embodiment, multiple thumbnail images prepared from one moving image content are arrayed in a single horizontal row in the time-stamp order so as to be displayed as the lateral thumbnail line 231, and respective thumbnail images of different moving image contents, that is, thumbnail images each added with a bookmark (important thumbnail images) are arrayed in a single vertical row so as to be displayed as the vertical thumbnail line 232. Alternatively, as illustrated in FIG. 13, functions of the vertical and lateral thumbnail lines may be interchanged. In other words, multiple thumbnail images prepared from one moving image content are arrayed in a single vertical row in the time-stamp order so as to be displayed as a vertical thumbnail line 232A, and respective thumbnail images of different moving image contents, that is, thumbnail images each added with a bookmark (important thumbnail images) are arrayed in a single horizontal row so as to be displayed as the horizontal thumbnail line 231A.

Third Modification

In this third modification, such a system is introduced as to give a priority to each thumbnail image in addition to a bookmark based on a preset reference so that high-priority thumbnail images of moving image contents are preferentially displayed on the vertical thumbnail line. This system is capable of supporting users to more efficiently find scenes that the users are searching for.

There are various systems that give a priority to each thumbnail image. Among those, such a method can be given in which smiles are used as a reference. In this method, for example, peoples' smiles are detected from frames with use of an image-recognition technology, and the number of smiles is calculated. Then, a smile degree is calculated based on, for example, sizes of the smiles and a matching degree with respect to reference patterns of smiles. At least one of the smile number and the smile degree is adopted in accordance with a user's setting, and high priorities are given to thumbnail images in the descending order of a value of the smile number or the smile degree.

FIG. 14 shows a configuration of a thumbnail management database prepared in this third modification. A part surrounded by bold lines is a part relating to prioritization with respect to the thumbnail images each added with a bookmark (important thumbnail images). In FIG. 14, priorities with respect to the important thumbnail images are added thereto as bookmark ranks. The user presets the bookmark ranks to be given based on the smile degree. Thus, higher bookmark ranks are given sequentially to thumbnail images of higher smile degrees.

By adoption of this method, of the important thumbnail images, important thumbnail images, which have features most conforming to those of scenes that the users try to find, can be displayed on the vertical thumbnail line. As a result, the users can be supported to more efficiently find the scenes that the users are searching for.

Second Embodiment

Surveillance System

Next, description is made on a surveillance system according to a second embodiment of the present disclosure.

In surveillance systems, with regard to point marks, which are combined into a preview image of a surveillance video taken by a surveillance camera, on highlight objects, it is convenient to collectively display all the point marks regardless of point marks on a highlight object existing in a preview image being displayed and past point marks accumulated previous to a time point of a thumbnail image corresponding to the preview image.

Figure 15:
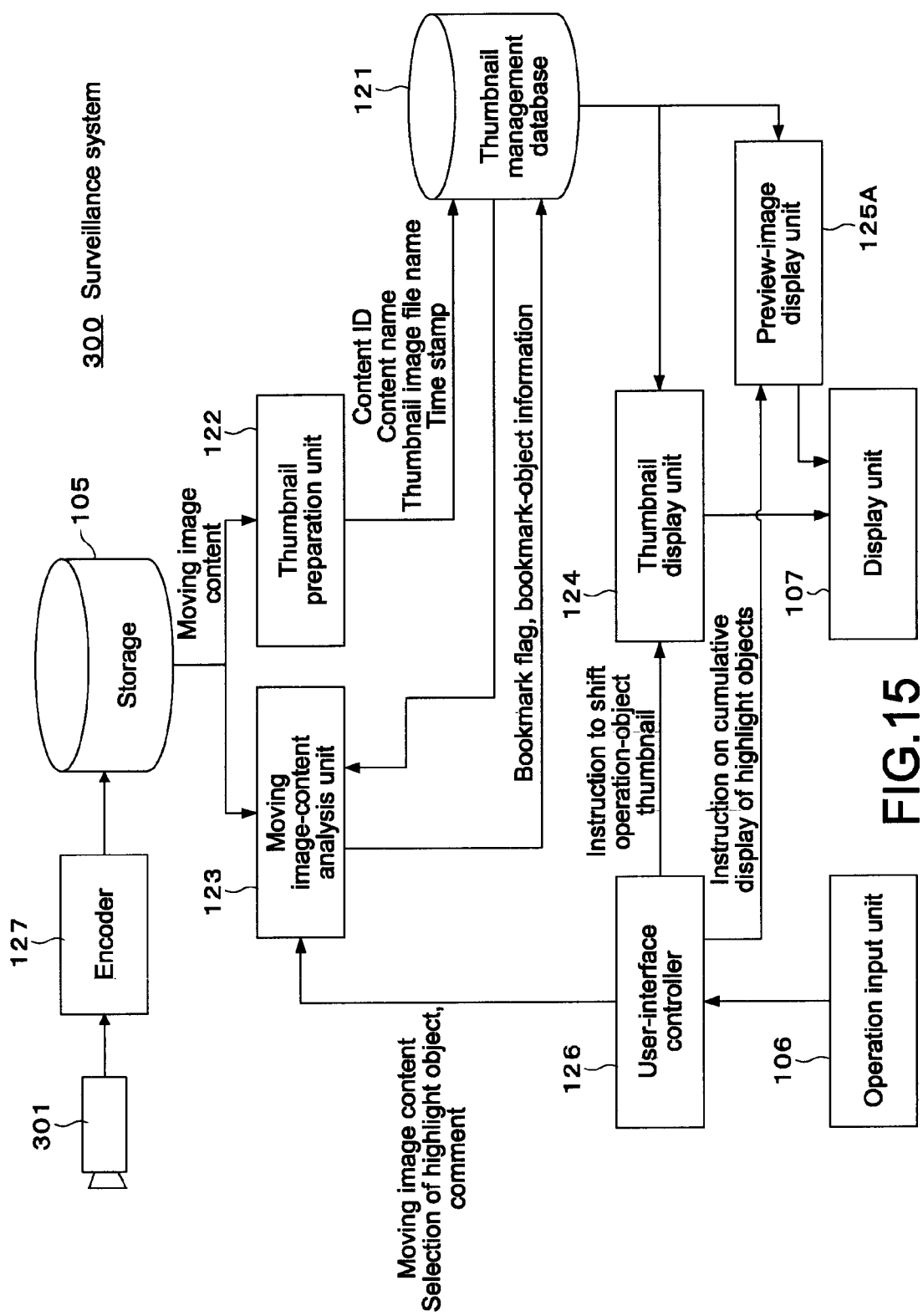
FIG. 15 is a block diagram of a configuration of a surveillance system according to a second embodiment of the present disclosure.

FIG. 15 is a block diagram of a configuration of a surveillance system 300 according to this embodiment. A surveillance camera 301 captures a video of a surveillance object. The video captured by the surveillance camera 301 is provided to the information processing apparatus 100, compression-coded into a predetermined format such as MPEG-2 by an encoder 127, and stored in the storage 105. For example, a surveillance video successively taken for a predetermined time period of, for example, twenty four hours, is stored as one moving image content in the storage 105.

The thumbnail preparation unit 122 generates, from the moving image contents stored in the storage 105, thumbnail images each representing a scene for each predetermined time interval, and registers respective information pieces with regard to the thumbnail images thus generated into the thumbnail management database 121 as new records.

The moving image-content analysis unit 123 analyzes the moving image contents stored in the storage 105 for the purpose of detection of a moving body, and judges, as important scenes, the scenes in which highlight objects are detected. The moving image-content analysis unit 123 judges a representative thumbnail image of the important scenes through comparison of time positions of the important scenes thus judged in the moving image contents and respective time stamps for the thumbnail images registered to the thumbnail management database 121. Then, the moving image-content analysis unit 123 sets bookmark flags with respect to records of information pieces with regard to the thumbnail images thus judged. Further, the moving image-content analysis unit 123 generates the following as the bookmark-object information pieces: positional information pieces of highlight objects such as moving bodies, which are detected in frames judged as the important scenes, in frame spaces; and readable comment information pieces such as reasons for addition of bookmarks, and then registers the bookmark-object information pieces into the thumbnail management database 121.

The thumbnail display unit 124 is activated when the user instructs, via the user-interface controller 126, thumbnail-image listing for search for scenes. The thumbnail display unit 124 refers to the thumbnail management database 121, and arranges multiple thumbnail images belonging to one moving image content in a single horizontal row in a time-stamp order so as to display them as the lateral thumbnail line. In addition, for different moving image contents, the thumbnail display unit 124 arranges thumbnail images each added with a bookmark (important thumbnail images) in a single vertical row, and displays them as a vertical thumbnail line. In other words, when one moving image content is a surveillance video in an amount corresponding to twenty four hours, a part of a time-series part corresponding to the thumbnail images of the surveillance video in the amount corresponding to twenty four hours (single day) is displayed on the lateral thumbnail line, and the important thumbnail images of a moving image content of each day are displayed on the vertical thumbnail line.

A preview-image display unit 125A displays preview images which correspond to thumbnail images displayed as operation-object thumbnails. Further, when bookmark-object information pieces are registered in the thumbnail management database 121 correspondingly to the thumbnail images, the preview-image display unit 125A generates a point mark for indicating a position of a highlight object such as a moving body in the preview image based on a positional information piece of the highlight object which is contained in the bookmark-object information pieces. Then, the preview-image display unit 125A displays the point mark after combining the point mark thus generated into the preview image together with a comment information piece contained in the bookmark-object information pieces.

Further, the surveillance system 300 is capable of collectively displaying point marks and comment information pieces in such a manner as to include past point marks accumulated from a time point of the thumbnail image corresponding to the preview image.

In other words, when the user gives, via the user-interface controller 126, such an instruction as to display the accumulated point marks and the accumulated comment information pieces, the preview-image display unit 125A extracts past bookmark-object information pieces previous to a time point of a thumbnail image corresponding to the preview image, that is, all the past bookmark-object information pieces or past bookmark-object information pieces from a certain time period ago.

Then, the preview-image display unit 125 displays the point marks for indicating positions of those past bookmark-object information pieces and the comment information pieces after combining those point marks and those comment information pieces based on those bookmark-object information pieces.

According to the surveillance system 300 in this embodiment, even when the user does not browse thumbnail images corresponding to the entire time period of the surveillance video, the user can confirm highlight objects with the preview image obtained by combination of the past point marks indicating positions of the highlight objects and the comment information pieces. Thus, surveillance can be performed with higher accuracy and efficiency. Further, in combination with thumbnail-image display methods in other embodiments, previous- and subsequent motions of a highlight object such as a moving body can be satisfactorily grasped. Thus, characteristics of the highlight object can be ascertained.

Note that, when information pieces such as time stamps are contained in the comment information pieces, respective time points at which moving bodies are detected can be known. Based on the time points, thumbnail images corresponding to scenes in which the moving bodies are detected can be specified. Then, displaying of preview images corresponding to the thumbnail images enables an operation to smoothly shift to confirmation operations on the moving bodies. Further, by combination with the progress bar in the first modification, the thumbnail images corresponding to the scenes in which the moving bodies are detected can be more smoothly displayed, which enables an operation to smoothly shift to the confirmation operations.

In addition, when the point mark for indicating the position of the highlight object in the preview image is selected by a click operation and the like, the thumbnail image including the selected highlight object may be displayed at the position of the operation-object thumbnail, and the preview image corresponding thereto may be displayed. With this, more intuitive operability can be obtained.

Note that, in the above-mentioned surveillance system 300, the point marks and the comment information pieces of all the highlight objects within a time period from a time point of a thumbnail image being displayed as the operation-object thumbnail to a time point a certain time period ago are displayed after being combined into the preview images. Alternatively, point marks and comment information pieces of all the highlight objects within a time period from the time point of a thumbnail image being displayed as the operation-object thumbnail to a shooting starting time point, or to a shooting completion time point may be displayed.

Third Embodiment

Next, description is made on an information processing apparatus according to a third embodiment of the present disclosure.

The information processing apparatus according to this embodiment is different from that according to the first embodiment in thumbnail displaying performed by the thumbnail display unit 124; in particular, assignment of important thumbnail images to the vertical thumbnail line 232. That is, in the first embodiment, the thumbnail display unit 124 displays respective important thumbnail images of different moving image contents on the vertical thumbnail line 232. In contrast, in the third embodiment, the thumbnail display unit 124 displays a part of a time series corresponding to respective important thumbnail images of one or more moving image contents on the vertical thumbnail line 232.

Figure 16:
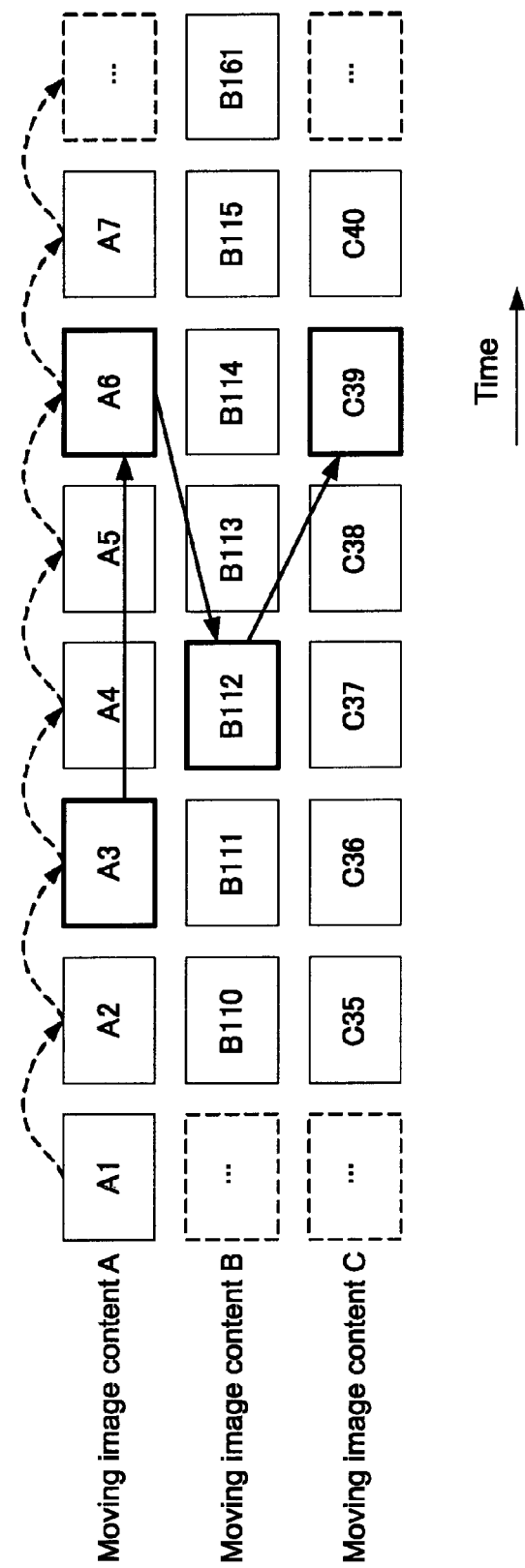
FIG. 16 illustrates a time series corresponding to important thumbnail images of one or more moving image contents in an information processing apparatus according to a third embodiment of the present disclosure.

In this context, description is made on the part of the time series corresponding to respective important thumbnail images of one or more moving image contents. FIG. 16 illustrates a time series corresponding to thumbnail images of three moving image contents A, B, and C. In FIG. 16, A3, A6, B112, and C39 each indicated by a bold square are thumbnails each added with a bookmark (important thumbnail images). The time series corresponding to respective important thumbnail images of one or more moving image contents is an array of the important thumbnail images A3, A6, B112, and C39 across one or more moving image contents. The important thumbnail images A3 and A6 are prepared from the same moving image content A.

Figure 17:
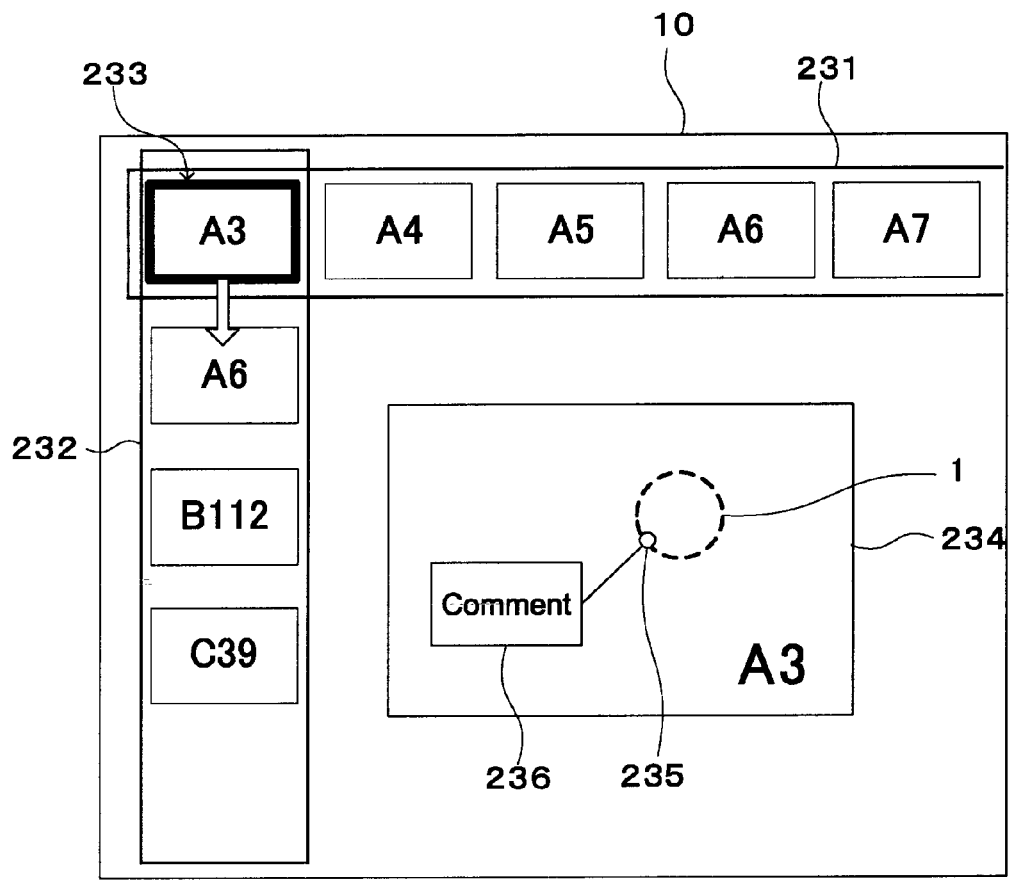
FIG. 17 illustrates an initial display mode of a lateral thumbnail line and a vertical thumbnail line according to the third embodiment.

FIG. 17 illustrates a scene searching screen prepared first by the thumbnail display unit 124 with respect to a set of the thumbnail images of FIG. 16.

The lateral thumbnail line 231 is constituted of N thumbnail images corresponding to a part of a time-series part in a thumbnail-image time series of one moving image content. The example of FIG. 17 illustrates a case where five thumbnail images belonging to one moving image content, that is, A3 to A7 successive in a time-stamp order constitute the lateral thumbnail line 231. The N thumbnail images are arrayed from left to right on the lateral thumbnail line 231 in the time-stamp order. In this way, the lateral thumbnail line 231 is prepared similar to the first embodiment.

The time-series part corresponding to the thumbnail images displayed on the lateral thumbnail line 231 is changed temporally back and forth by the instruction of the leftward or rightward shift with respect to an operation-object thumbnail 233 given by a user. Such an operation as to change the time-series part corresponding to the thumbnail images displayed on the lateral thumbnail line 231 is the same as that in the first embodiment.

Meanwhile, in this embodiment, the vertical thumbnail line 232 is constituted in a time series corresponding to respective important thumbnail images of one or more moving image contents. Specifically, the four important thumbnail images A3, A6, B112, and C39 constitute the vertical thumbnail line 232. The lateral thumbnail line 231 and the vertical thumbnail line 232 have such a relation as to cross and to be superimposed on each other via one thumbnail image. The one thumbnail image at this crossing point is defined as the operation-object thumbnail 233. In FIG. 17, the thumbnail image A3 is defined as the operation-object thumbnail 233.

All the thumbnail images displayed on the vertical thumbnail line 232 are thumbnail images each added with a bookmark (important thumbnail images) at least in an initial state. In other words, although the thumbnail image assigned as the operation-object thumbnail 233 may be a thumbnail image that has not yet been added with a bookmark owing to the shift operation of the time-series part corresponding to the thumbnail images displayed on the lateral thumbnail line 231, it is guaranteed that, on the vertical thumbnail line 232, all the thumbnail images other than the thumbnail image assigned as the operation-object thumbnail 233 are thumbnail images each added with a bookmark (important thumbnail images).

The vertical thumbnail line 232 is updated in accordance with the update of the lateral thumbnail line at the time-series part corresponding to the thumbnail images subsequent to the important thumbnail image at the shift destination on the vertical thumbnail line by the instruction of the upward or downward shift with respect to the operation-object thumbnail 233 given by the user.

Both the display position of the vertical thumbnail line 232 in the lateral direction and the display position of the lateral thumbnail line 231 in the vertical direction can be changed, for example, by the drag operation by the user. Further, the display screen 10 displays, simultaneously with those lateral thumbnail line 231 and vertical thumbnail line 232, the preview image 234 corresponding to the thumbnail image assigned as the operation-object thumbnail 233. Similar to those in the first embodiment, the point mark 235 and the comment information piece 236 are combined into the preview image 234.

[Operation of Thumbnail Display Unit 124]

Next, description is made on such an operation of the thumbnail display unit 124 as to prepare an initial lateral thumbnail line 231 and an initial vertical thumbnail line 232.

Figure 19:
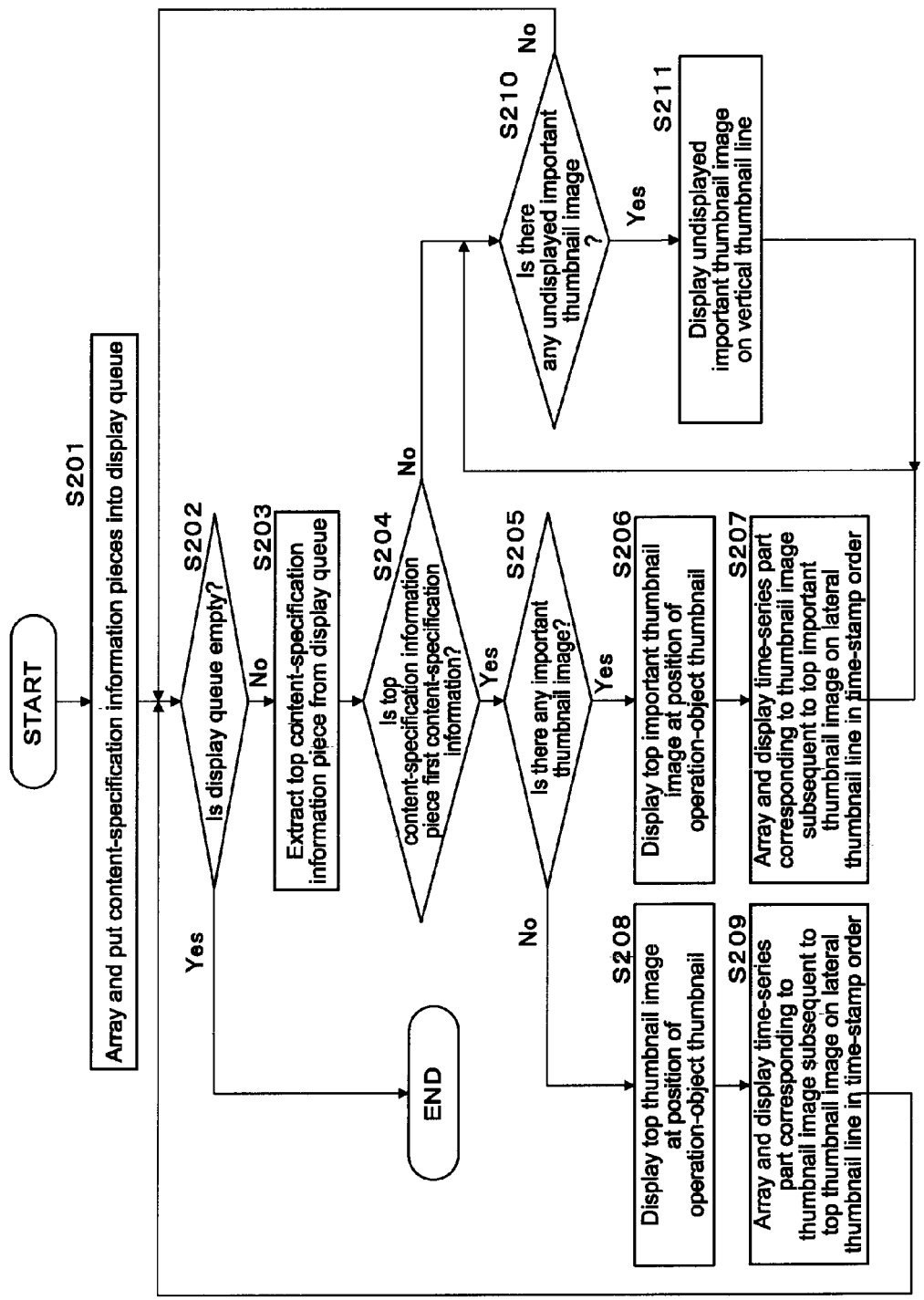
FIG. 19 is a flowchart showing a procedure of preparation, which is performed by a thumbnail display unit according to the third embodiment, of an initial lateral thumbnail line and an initial vertical thumbnail line.

FIG. 19 is a flowchart showing a procedure of preparation of the initial lateral thumbnail line 231 and the initial vertical thumbnail line 232 performed by the thumbnail display unit 124 of the information processing apparatus according to the third embodiment.

First, the thumbnail display unit 124 arrays respective information pieces for specification of moving image contents managed in the thumbnail management database 121, that is, content-specification information pieces such as contents IDs and content names in the order determined depending on those contents IDs, content names, and the like. Then, the thumbnail display unit 124 puts the content-specification information pieces into a display queue (S201). Next, the thumbnail display unit 124 extracts a top content-specification information piece from the display queue (S203).

When the top content-specification information piece is a content-specification information piece extracted first from the display queue (S204), the thumbnail display unit 124 refers to the thumbnail management database 121 based on this top content-specification information piece, and checks whether or not there exist thumbnail images each added with a bookmark (important thumbnail images) with regard to the corresponding moving image content (S205).

When the important thumbnail images do not exist, the thumbnail display unit 124 displays the top thumbnail image at the position of the operation-object thumbnail 233 (S208). Next, the thumbnail display unit 124 arrays and displays, at positions subsequent to the position of the operation-object thumbnail 233 on the lateral thumbnail line 231 in a time-stamp order, a time-series part corresponding to (N−1) thumbnail images subsequent to the top thumbnail image displayed at the position of the operation-object thumbnail 233 (S209). After that, the procedure shifts to S202.

Further, in S205, when the important thumbnail images exist, the thumbnail display unit 124 displays a top important thumbnail image of those important thumbnail images at a position of the operation-object thumbnail 233 (S206). Next, the thumbnail display unit 124 arrays and displays, at positions subsequent to the position of the operation-object thumbnail 233 on the lateral thumbnail line 231 in the time-stamp order, a time-series part corresponding to (N−1) thumbnail images subsequent to the top important thumbnail image displayed at the position of the operation-object thumbnail 233 (S207).

Then, the thumbnail display unit 124 checks whether or not the moving image content has undisplayed important thumbnail images (S210). When undisplayed important thumbnail images exist, the thumbnail display unit 124 sequentially adds the undisplayed thumbnail images below the operation-object thumbnail 233 on the vertical thumbnail line 232 from the top side (S211). In actuality, owing to a restriction on the display screen, the number of thumbnail images that can be displayed on the vertical thumbnail line 232 is limited. Thus, as soon as the upper limit number is reached, the operation of the thumbnail display unit 124 is completed. In this context, description is continued with respect to the operation below on the premise that, at the completion of the displaying of all the thumbnail images existing in one moving image content, the number of important thumbnail images displayed on the vertical thumbnail line 232 has not yet reached the upper limit number of the thumbnail images that can be displayed on the vertical thumbnail line 232.

After displaying all the important thumbnail images belonging to one moving image content on the vertical thumbnail line 232, the thumbnail display unit 124 extracts again another top content-specification information piece from the display queue (S203). Note that another top content-specification information piece at the top at this time point is an information piece that has been second from the top in the initial state of the display queue. Then, the thumbnail display unit 124 checks whether or not a moving image content, which is specified by a newly obtained content-information piece, has undisplayed important thumbnail images (S210). When undisplayed important thumbnail images exist, the thumbnail display unit 124 sequentially adds the undisplayed thumbnail images below the operation-object thumbnail 233 on the vertical thumbnail line 232 from the top side (S211). In a case where the number of important thumbnail images displayed on the vertical thumbnail line 232 has not yet reached the upper limit number of the thumbnail images that can be displayed on the vertical thumbnail line 232 at this time point, still another top content-specification information piece is extracted again from the display queue, and the same processes are repeated.

Further, also when the display queue becomes empty as a result of the above-mentioned processes (S202), the operation of the thumbnail display unit 124 is completed.

[User Operation with Respect to Vertical Thumbnail Line]

Next, description is made on a user operation with respect to the vertical thumbnail line 232. Note that a user operation with respect to the lateral thumbnail line 231 is the same as that in the first embodiment, and hence description thereof is omitted.

Figure 18:
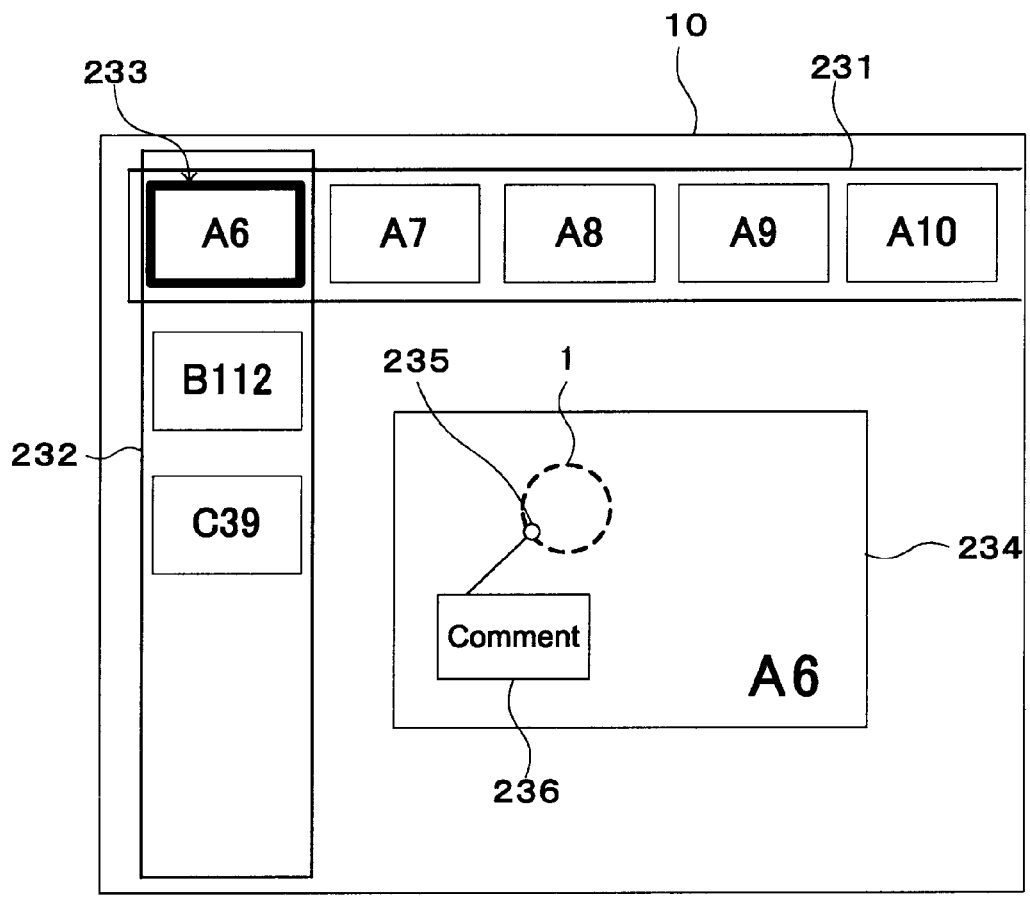
FIG. 18 illustrates an update result of the lateral thumbnail line and the vertical thumbnail line in a case where an instruction of a single downward shift is input to an operation-object thumbnail according to the third embodiment.

For example, in the state of FIG. 17, when the instruction of the single downward shift with respect to the operation-object thumbnail 233 is input, the thumbnail display unit 124 shifts, as illustrated in FIG. 18, an array of the thumbnail images on the vertical thumbnail line 232 so that the important thumbnail image A6 of the same moving image content comes to the position of the operation-object thumbnail 233 in place of the important thumbnail image A3. In accordance therewith, the thumbnail display unit 124 updates the lateral thumbnail line 231 at a time series part corresponding to the thumbnail images A7 to A10 subsequent to the important thumbnail image A6.

As described above in this embodiment, similar to the first embodiment, only by the instruction of the upward or downward shift with respect to the operation-object thumbnail 233 given by the user, the important thumbnail images to be displayed can be switched, and the user can view each of the important thumbnail images and the time-series part corresponding to the thumbnail images successive thereto. Thus, the user can grasp the important thumbnail images together with previous and subsequent motions of each of the important thumbnail images, and hence the user can more accurately and easily grasp contents of scenes. Further, in this embodiment, the part of the time series corresponding to respective important thumbnail images of one or more moving image contents is displayed on the vertical thumbnail line 232, and hence switching can be quickly performed between the respective important thumbnail images of one or more moving image contents temporally adjacent to each other. As a result, operability in scene search is enhanced.

Fourth Embodiment

Next, description is made on an information processing apparatus according to a fourth embodiment of the present disclosure.

In the embodiments and modifications above, at least a part of a time-series part of a thumbnail-image time series of one moving image content is arrayed and displayed in the lateral direction of the display screen 10, and one or more thumbnail images each added with a bookmark (important thumbnail images) are arrayed and displayed in the vertical direction of the display screen 10. However, the present disclosure is not limited thereto.

In this fourth embodiment, at least the part of the time-series part of the thumbnail-image time series of one moving image content and one or more thumbnail images each added with a bookmark (important thumbnail images) are arrayed and displayed in the lateral direction.

Figure 20:
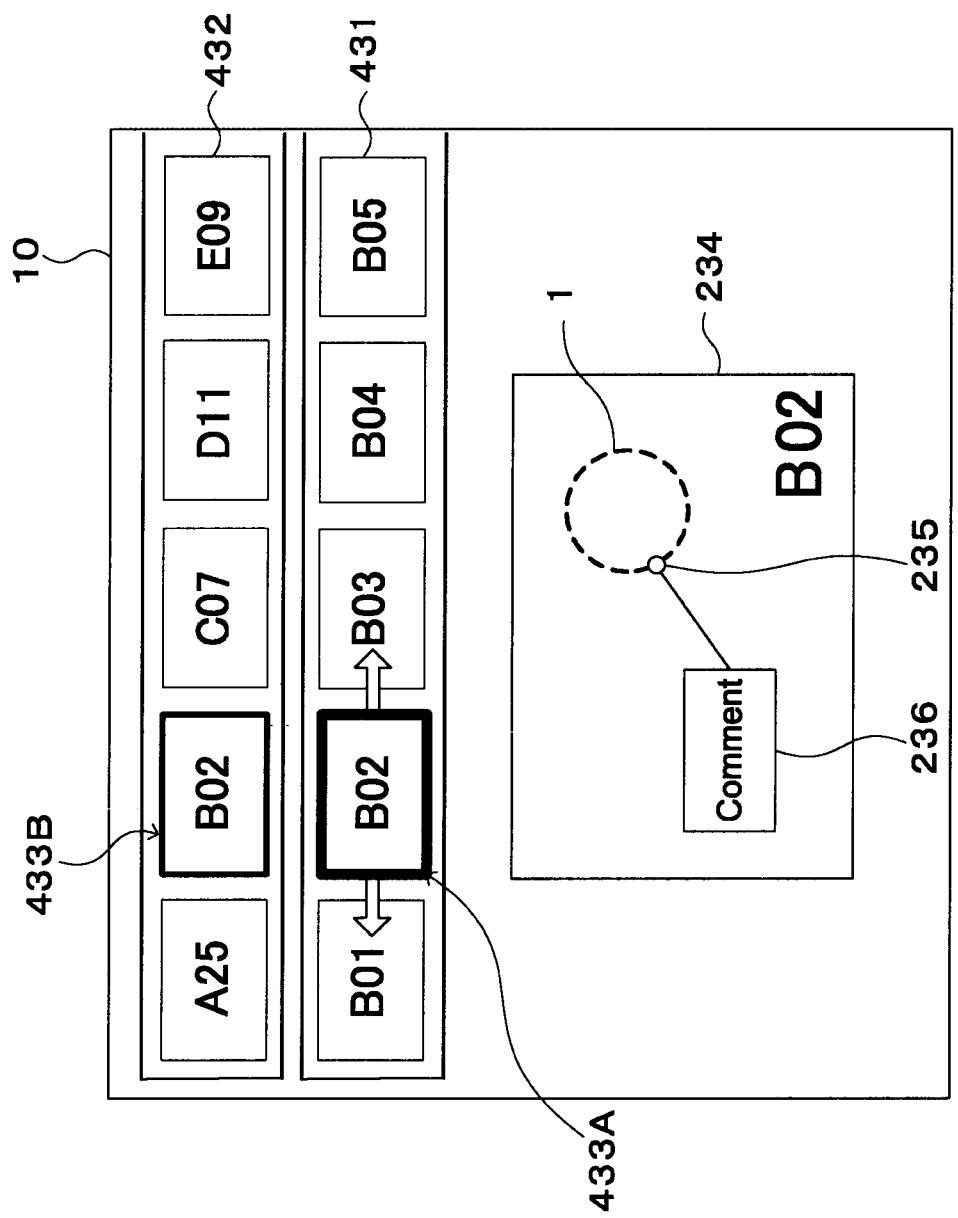
FIG. 20 illustrates a display mode of two thumbnail lines according to a fourth embodiment.

FIG. 20 illustrates a display mode of the two thumbnail lines according to the fourth embodiment. A first lateral thumbnail line 431 is the same as the lateral thumbnail line 231 in the first embodiment; specifically, constituted of N thumbnail images corresponding to at least the part of the time-series part in the thumbnail-image time series of one moving image content. The N thumbnail images are arrayed from left to right on the lateral thumbnail line 231 in a time-stamp order.

A second lateral thumbnail line 432 is constituted of the one or more thumbnail images each added with a bookmark (important thumbnail images). In this embodiment, although the second lateral thumbnail line 432 is constituted of a total of M thumbnail images of different moving image contents, the M thumbnail images are not limited to the thumbnail images of different moving image contents. On the second lateral thumbnail line 432, similar to the first lateral thumbnail line 431, the M thumbnail images are arrayed from left to right, for example, in the order of a content ID. In other words, the thumbnail images are arrayed in the lateral direction on both the first lateral thumbnail line 431 and the second lateral thumbnail line 432.

The first lateral thumbnail line 431 and the second lateral thumbnail line 432 share thumbnail images. In FIG. 20, thumbnail images B02 exist as thumbnail images shared between the first lateral thumbnail line 431 and the second lateral thumbnail line 432. Those two thumbnail images B02 correspond to a first operation-object thumbnail 433A and a second operation-object thumbnail 433B. In this embodiment, the first lateral thumbnail line 431 and the second lateral thumbnail line 432 are arranged and displayed in parallel to each other in such a manner that the shared thumbnail image belonging to the first lateral thumbnail line 431 and the shared thumbnail image belonging to the second lateral thumbnail line 432 are arrayed in the vertical direction.

A user alternatively switches the first operation-object thumbnail 433A and the second operation-object thumbnail 433B in such a manner that any one of the operation-object thumbnails is constantly in an active state as an operation object. For example, in FIG. 20, the first operation-object thumbnail 433A on the first lateral thumbnail line 431 is in an active state by default. By an instruction of a leftward or rightward shift with respect to the first operation-object thumbnail 433A given from a user, the time-series part corresponding to the thumbnail images displayed on the first lateral thumbnail line 431 is changed temporally back and forth.

Figure 21:
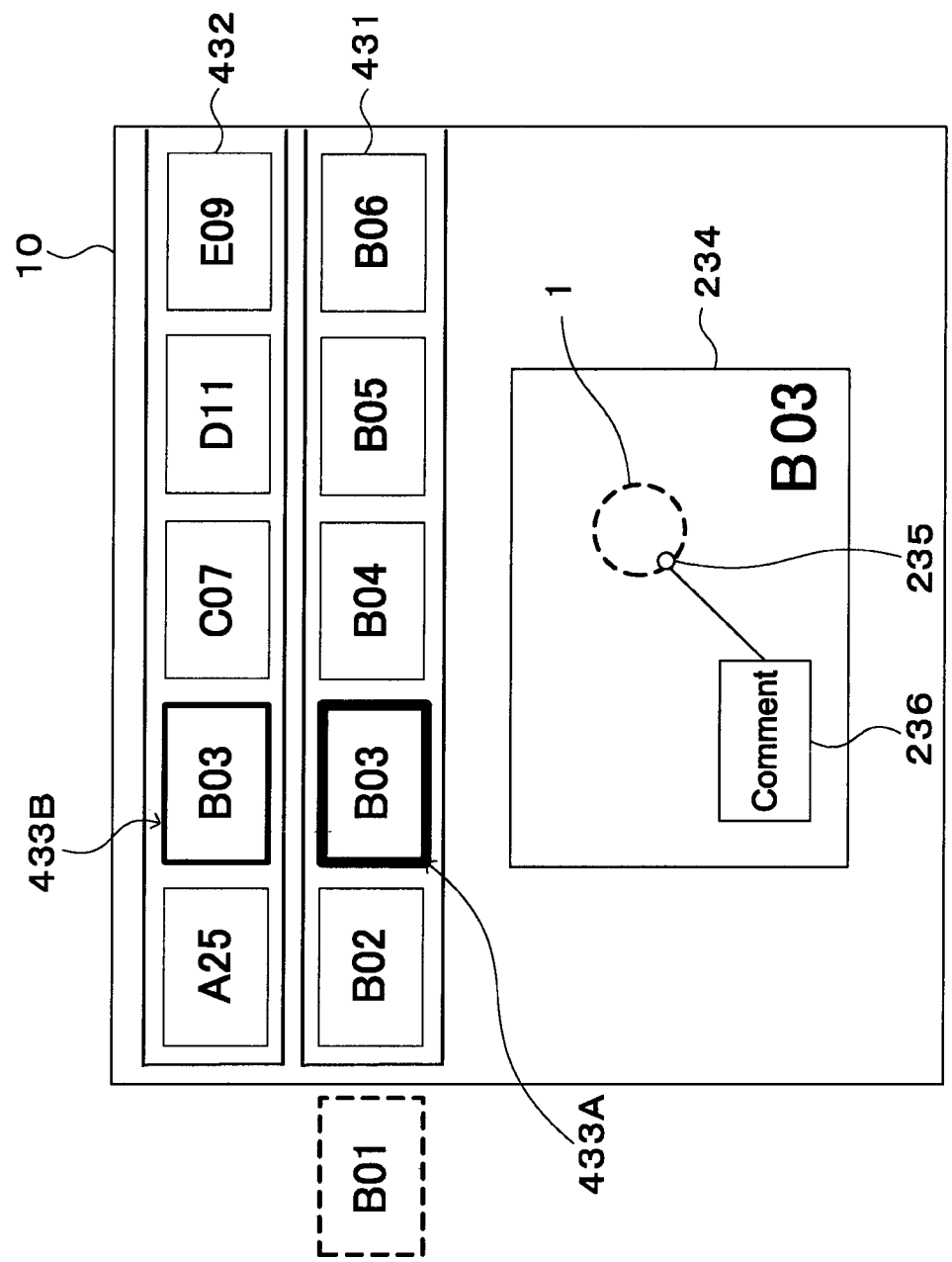
FIG. 21 illustrates an update result of the thumbnail lines in a case where, in the fourth embodiment, an instruction of a single leftward shift is input to a first operation-object thumbnail.

For example, in the state of FIG. 20, when an instruction of a single rightward shift with respect to the first operation-object thumbnail 433A is input, the thumbnail display unit 124 shifts, as illustrated in FIG. 21, the time-series part corresponding to the thumbnail images displayed on the first lateral thumbnail line 431 so that the thumbnail image B03 comes to a position of the first operation-object thumbnail 433A in place of the thumbnail image B02. In accordance therewith, the preview-image display unit 125 updates, as the preview image 234, the image corresponding to the thumbnail image B02 to the image corresponding to the thumbnail image B03.

Further, the thumbnail display unit 124 updates, as a thumbnail image as the second operation-object thumbnail 433B on the second lateral thumbnail line 432, the thumbnail image B02 to the thumbnail image B03. Note that this thumbnail image as the second operation-object thumbnail 433B on the second lateral thumbnail line 432 does not need to be updated.

Meanwhile, in order to perform an operation with respect to the second operation-object thumbnail 433B on the second lateral thumbnail line 432, a user first performs a predetermined operation for switching an operation object from the first operation-object thumbnail 433A to the second operation-object thumbnail 433B. Any method may be employed as this switching operation.

Figure 22:
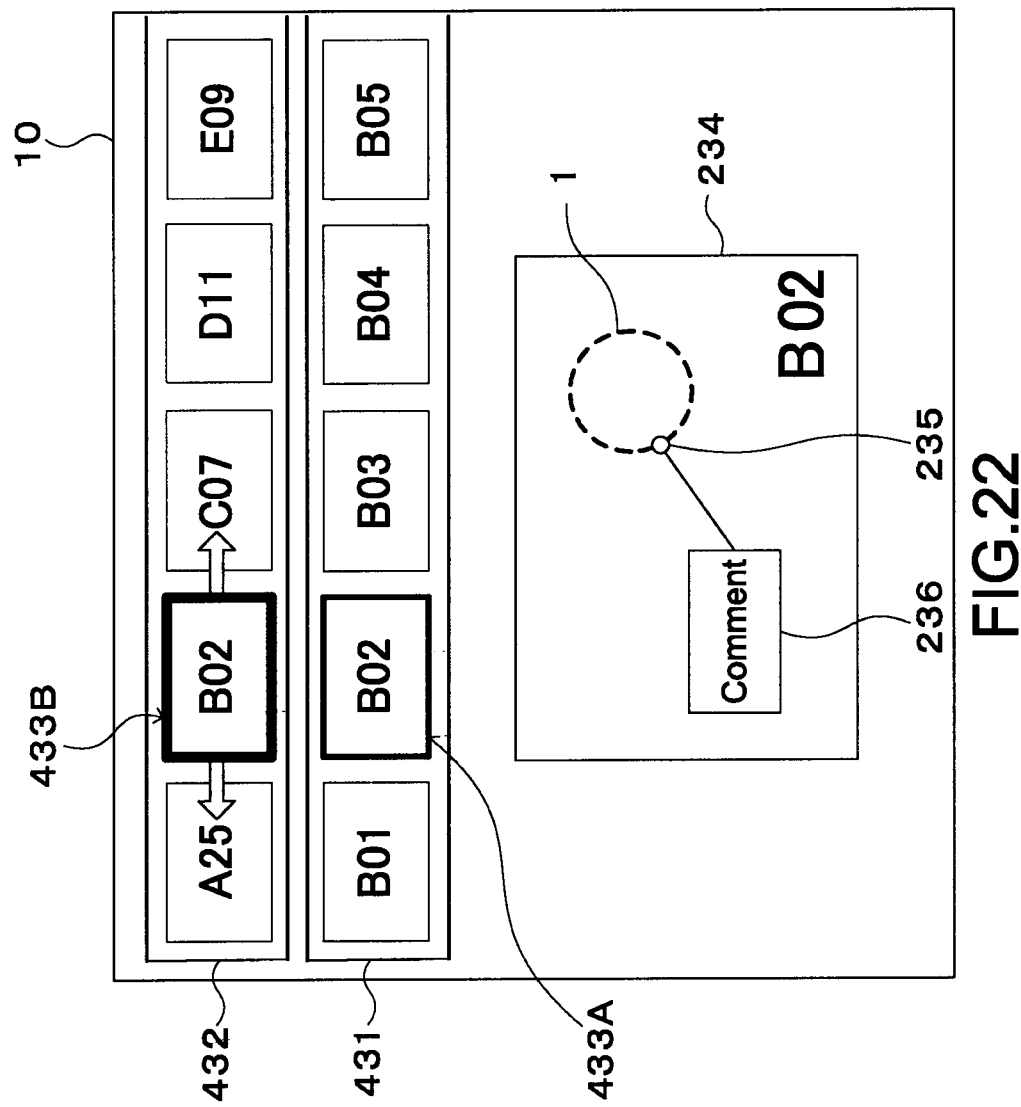
FIG. 22 illustrates a state in which, in the fourth embodiment, an operation object is switched from the first operation-object thumbnail on a first lateral thumbnail line to a second operation-object thumbnail on a second lateral thumbnail line.

FIG. 22 illustrates a state immediately after an operation object has been switched from the first operation-object thumbnail 433A on the first lateral thumbnail line 431 to the second operation-object thumbnail 433B on the second lateral thumbnail line 432. When the user gives an instruction of a leftward or rightward shift with respect to the second operation-object thumbnail 433B, an array of the respective thumbnail images of the different moving image contents that are displayed on the second lateral thumbnail line 432 is updated. In accordance therewith, moving image contents assigned to the first lateral thumbnail line 431 are updated.

Figure 23:
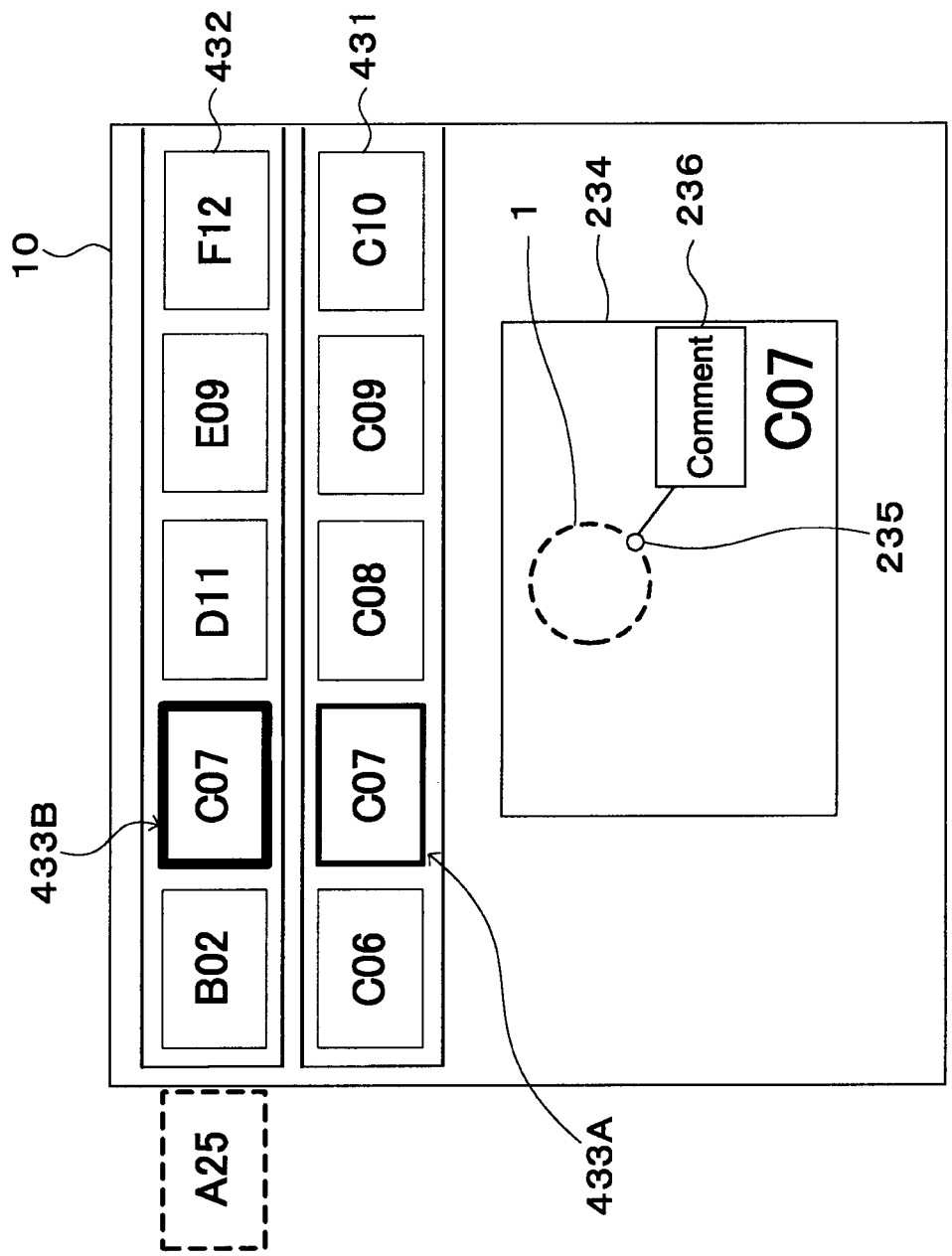
FIG. 23 illustrates an update result of the thumbnail lines in a case where, in the fourth embodiment, an instruction of a single leftward shift is input to the second operation-object thumbnail.

For example, in the state of FIG. 22, when the instruction of the single rightward shift with respect to the first operation-object thumbnail 433A is input, the thumbnail display unit 124 shifts, as illustrated in FIG. 23, an array of the thumbnail images on the second lateral thumbnail line 432 so that the important thumbnail image C07 comes to a position of the second operation-object thumbnail 433B in place of the thumbnail image B02. In this case, the important thumbnail image, which is assigned as the second operation-object thumbnail 433B, is C07. Thus, the five thumbnail images of C06 to C10 are displayed while being assigned to the first lateral thumbnail line 431. Further, in accordance therewith, the preview-image display unit 125 updates, as the preview image 234, the image corresponding to the thumbnail image B02 to the image corresponding to the important thumbnail image C07.

As described above in this embodiment, only by the instruction of the leftward or rightward shift with respect to the second operation-object thumbnail 433B given by the user, the important thumbnail images to be displayed can be switched, and the user can view each of the important thumbnail images and the time-series part corresponding to the thumbnail images successive thereto.

Thus, the user can grasp the important thumbnail images together with previous and subsequent motions of each of the important thumbnail images, and hence the user can more accurately and easily grasp contents of scenes. Further, in this embodiment, the respective important thumbnail images of the different moving image contents are displayed on the second lateral thumbnail line 432, and hence display switching can be quickly performed between the respective important thumbnail images of the different moving image contents. As a result, operability in scene search is enhanced.

Further, the time-series part corresponding to the thumbnail images displayed on the first lateral thumbnail line 431 can be shifted by the instruction of the leftward or rightward shift with respect to the first operation-object thumbnail 433A. Thus, thumbnail images, which are out of a range displayed on the first lateral thumbnail line 431 immediately after an object of scene search is switched to another moving image content, can be freely referred to.

Note that, in this embodiment, although being arrayed and displayed in the lateral direction, at least a part of a time-series part of a thumbnail-image time series of one moving image content and one or more thumbnail images each added with a bookmark (important thumbnail images) may be arrayed and displayed in the vertical direction.

Fourth Modification

Figure 24:
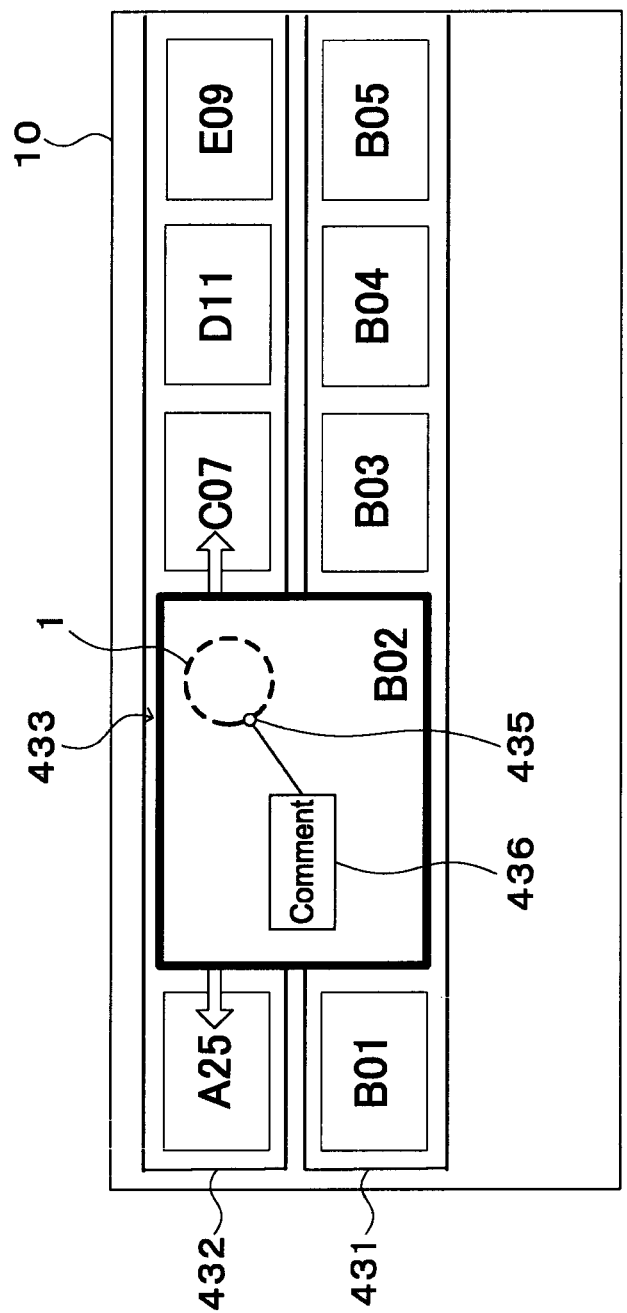
FIG. 24 illustrates a modification of the fourth embodiment.

FIG. 24 illustrates a modification of the fourth embodiment.

In the fourth embodiment, the thumbnail images shared between the first lateral thumbnail line 431 and the second lateral thumbnail line 432 are displayed as the first operation-object thumbnail 433A and the second operation-object thumbnail 433B. Alternatively, as illustrated in FIG. 24, a preview image corresponding to the shared thumbnail images may be displayed as a single operation-object thumbnail 433 in such a manner as to cross the first lateral thumbnail line 431 and the second lateral thumbnail line 432.

For example, the first lateral thumbnail line 431 is set by default as an operation object of the operation-object thumbnail 433, and the time-series part corresponding to the thumbnail images displayed on the first lateral thumbnail line 431 is changed temporally back and forth by the instruction of the leftward or rightward shift with respect to the operation-object thumbnail 433 given by a user. Meanwhile, in order to set the second lateral thumbnail line 432 to be an operation object, the user performs a predetermined operation for switching an operation object of the operation-object thumbnail 433 from the first lateral thumbnail line 431 to the second lateral thumbnail line 432. Any method may be employed as this switching operation. After that, by the instruction of the leftward or rightward shift with respect to the operation-object thumbnail 433, the array of the respective thumbnail images of the different moving image contents, which are displayed on the second lateral thumbnail line 432, is updated. In accordance therewith, the moving image contents assigned to the first lateral thumbnail line 431 are updated.

According to this modification, the display region of the thumbnail image of the operation-object thumbnail doubles as a display region of the preview image, and hence is promising as a scene searching screen to be employed for apparatuses which have a severe restriction on a size of a display screen, such as a smartphone.

The embodiments and modifications described above can be used in combination as necessary.

As a matter of course, the present disclosure is not limited to the above-mentioned embodiments, and various modifications may be made without departing from the spirit of the present disclosure.

The present disclosure claims priority under 35 U.S.C. §119 and contains subject matter related to that disclosed in Japanese Priority Patent Application JP 2010-240974 filed in the Japanese Patent Office on Oct. 27, 2010, the entire content of which is hereby incorporated by reference herein.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising:
processing circuitry configured to
analyze one or more moving images to detect scenes in the one or more moving images that exhibit at least one predetermined image characteristic, wherein an interpretation of the at least one predetermined image characteristic exhibited by the detected scenes improves when the detected scenes are viewed in a temporal context;
prioritize the detected scenes within the moving images according to a measure of the at least one predetermined image characteristic;
bookmark the detected scenes that are prioritized above a predetermined threshold;
retrieve thumbnail images, each thumbnail image representing a scene of a different time of the one or more moving images, and at least one thumbnail image representing one of the bookmarked scenes;
time sequentially display a first plurality of thumbnail images as a first thumbnail line to provide temporal context of a scene of a selected moving image, each thumbnail image of the first plurality of thumbnail images corresponding to the scene of the selected moving image within a predetermined time interval, the selected moving image being one of the one or more moving images;
display a second plurality of thumbnail images as a second thumbnail line, each thumbnail image of the second plurality of thumbnail images corresponding to a marked part of a plurality of marked parts of the one or more moving images, the second thumbnail line including a selected thumbnail, the selected thumbnail corresponding to a thumbnail in the first thumbnail line, and the plurality of marked parts including the bookmarked scenes; and
shift a selection of the selected thumbnail along the second thumbnail line and update the selected thumbnail, the selected moving image, and the first thumbnail line in response to a user instruction, wherein
the updated first thumbnail line comprises thumbnail images each corresponding to a respective scene of the updated selected moving image within an updated predetermined time interval including the updated selected thumbnail.

2. The apparatus according to claim 1, wherein the processing circuitry is further configured to display the first thumbnail line in a horizontal direction.

3. The apparatus according to claim 1, wherein the processing circuitry is further configured to display the second thumbnail line in a vertical direction.

4. The apparatus according to claim 1, wherein the processing circuitry is further configured to display the first thumbnail line in a direction perpendicular to a display direction of the second thumbnail line.

5. The apparatus according to claim 1, wherein the processing circuitry is further configured to display the second thumbnail line such that the second thumbnail line intersects the first thumbnail line at the selected thumbnail.

6. The apparatus according to claim 1, wherein the processing circuitry is further configured to display, as the second plurality of thumbnails, bookmarked thumbnails representing bookmarked scenes of the one or more moving images, the bookmarked scenes being scenes previously marked by the user.

7. The apparatus according to claim 1, wherein the processing circuitry is further configured to display the first thumbnail line in a horizontal direction and display the second thumbnail line in the horizontal direction.

8. The electronic apparatus according to claim 1, wherein the at least one predetermined image characteristic exhibited by the detected scenes is a smile.

9. A thumbnail view control method comprising:
analyzing one or more moving images to detect scenes in the one or more moving images that exhibit at least one predetermined image characteristic, wherein an interpretation of the at least one predetermined image characteristic exhibited by the detected scenes improves when the detected scenes are viewed in a temporal context;
prioritizing the detected scenes within the moving images according to a measure of the at least one predetermined image characteristic;
bookmarking the detected scenes that are prioritized above a predetermined threshold;
retrieving thumbnail images, each thumbnail image representing a scene of a different time of the one or more moving images, and at least one thumbnail image representing one of the bookmarked scenes;
time sequentially displaying a first plurality of thumbnail images as a first thumbnail line to provide temporal context of a scene of a selected moving image, each thumbnail image of the first plurality of thumbnail images corresponding to the scene of the selected moving image within a predetermined time interval, the selected moving image being one of the one or more moving images;
displaying a second plurality of thumbnail images as a second thumbnail line, each thumbnail image of the second plurality of thumbnail images corresponding to a marked part of a plurality of marked parts of the one or more moving images, the second thumbnail line including a selected thumbnail, and the selected thumbnail corresponding to a thumbnail in the first thumbnail line, and the plurality of marked parts include the bookmarked scenes; and
shifting a selection of the selected thumbnail along the second thumbnail line and update the selected thumbnail, the selected moving image, and the first thumbnail line in response to a user instruction, wherein
the updated first thumbnail line comprises thumbnail images each corresponding to a respective scene of the updated selected moving image within an updated predetermined time interval including the updated selected thumbnail.

10. The thumbnail view control method according to claim 9, wherein the first thumbnail line is displayed in a horizontal direction and the second thumbnail line is displayed in a vertical direction.

11. A non-transitory computer readable medium encoded with computer readable instructions which, when loaded onto a processor, cause the processor to perform a thumbnail view control method comprising:
analyzing analyze one or more moving images to detect scenes in the one or more moving images that exhibit at least one predetermined image characteristic, wherein an interpretation of the at least one predetermined image characteristic exhibited by the detected scenes improves when the detected scenes are viewed in a temporal context;
prioritizing the detected scenes within the moving images according to a measure of the at least one predetermined image characteristic;
bookmarking the detected scenes that are prioritized above a predetermined threshold;
retrieving thumbnail images, each thumbnail image representing a scene of a different time of one or more moving images, and at least one thumbnail image representing one of the bookmarked scenes;
time sequentially displaying a first plurality of thumbnail images as a first thumbnail line to provide temporal context of a scene of a selected moving image, each thumbnail image of the first plurality of thumbnail images corresponding to the scene of the selected moving image within a predetermined time interval, the selected moving image being one of the one or more moving images;
displaying a second plurality of thumbnail as a second thumbnail line, each thumbnail image of the second plurality of thumbnail images corresponding to a marked part of a plurality of marked parts of the one or more moving images, the second thumbnail line including a selected thumbnail, and the selected thumbnail corresponding to a thumbnail in the first thumbnail line, and the plurality of marked parts include the bookmarked scenes; and
shifting a selection of the selected thumbnail along the second thumbnail line and updating the selected thumbnail, the selected moving image, and the first thumbnail line in response to a user instruction, wherein
the updated first thumbnail line comprises thumbnail images each corresponding to a respective scene of the updated selected moving image within an updated predetermined time interval including the updated selected thumbnail.

* * * * *